US009116706B2

(12) United States Patent
Yunten

(10) Patent No.: US 9,116,706 B2
(45) Date of Patent: Aug. 25, 2015

(54) YUNTEN'S WEB APPLICATION METHODOLOGY AND WEB PROGRAMMING LANGUAGE (YWAM AND WPL)

(71) Applicant: Tamer Yunten, Christianburg, VA (US)

(72) Inventor: Tamer Yunten, Christianburg, VA (US)

( * ) Notice: Subject to any disclaimer, the term of this patent is extended or adjusted under 35 U.S.C. 154(b) by 0 days.

(21) Appl. No.: 14/045,811

(22) Filed: Oct. 4, 2013

(65) Prior Publication Data

US 2014/0109041 A1 Apr. 17, 2014

Related U.S. Application Data

(60) Provisional application No. 61/795,065, filed on Oct. 9, 2012.

(51) Int. Cl.
*G06F 9/44* (2006.01)
(52) U.S. Cl.
CPC .......................................... *G06F 8/34* (2013.01)
(58) Field of Classification Search
None
See application file for complete search history.

(56) References Cited

U.S. PATENT DOCUMENTS

| 8,331,566 | B1 * | 12/2012 | Foote et al. | 380/255 |
| 8,578,329 | B1 * | 11/2013 | Chiluvuri | 717/107 |
| 2010/0281107 | A1 * | 11/2010 | Fallows et al. | 709/203 |
| 2011/0277002 | A1 * | 11/2011 | Xiong et al. | 725/104 |
| 2012/0079419 | A1 * | 3/2012 | Ajitomi et al. | 715/781 |
| 2012/0179779 | A1 * | 7/2012 | Awasthi | 709/217 |
| 2012/0324358 | A1 * | 12/2012 | Jooste | 715/733 |
| 2013/0054679 | A1 * | 2/2013 | Jooste | 709/203 |
| 2013/0104021 | A1 * | 4/2013 | van den Broek et al. | 715/220 |
| 2013/0276009 | A1 * | 10/2013 | Ajitomi et al. | 725/14 |
| 2014/0075486 | A1 * | 3/2014 | Wang et al. | 725/68 |

* cited by examiner

*Primary Examiner* — Don Wong
*Assistant Examiner* — Daxin Wu

(57) ABSTRACT

This invention introduces a structured software engineering methodology for developing interactive network application systems that use a web browser as a user-dialog engine. The methodology uses two server types: Application Server(s) for instantiating and executing an application instance in binary code, and HTTP Server(s) for delivering to the user's browser the textual HTML+Javascript user-dialog documents used by this application instance during its execution. An application is accessed by executing at the user's browser an Application Instantiation Page (AIP) which is a part of this invention. The methodology is built into a notational programming language.

10 Claims, 22 Drawing Sheets

Example instantiation and execution of a web application.

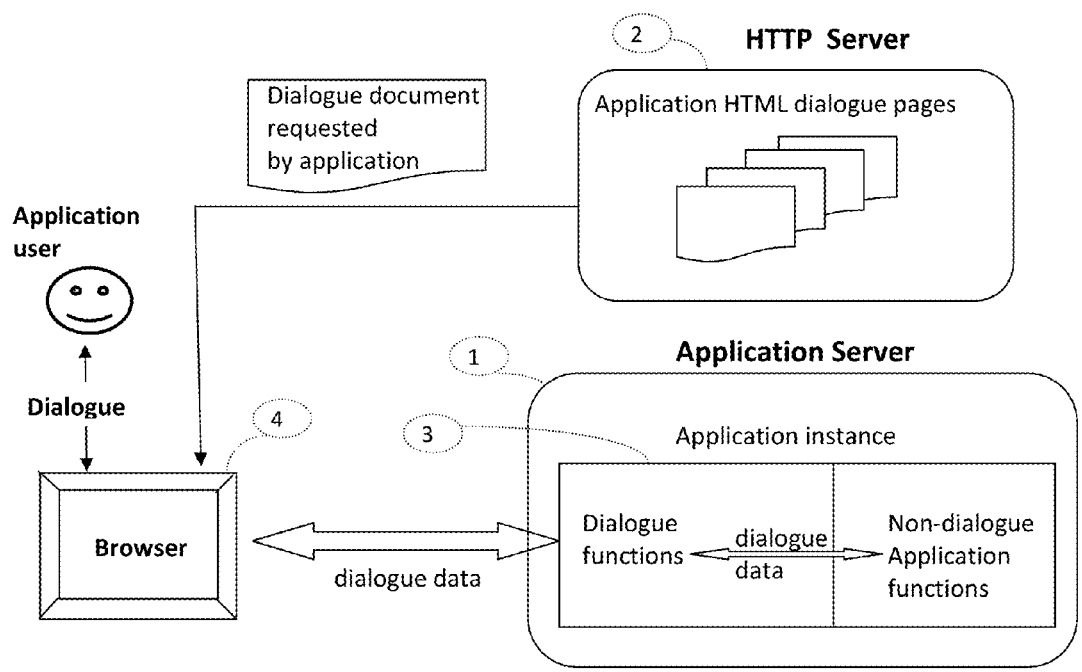
Figure 1. A high-level view of execution of a WEB application.

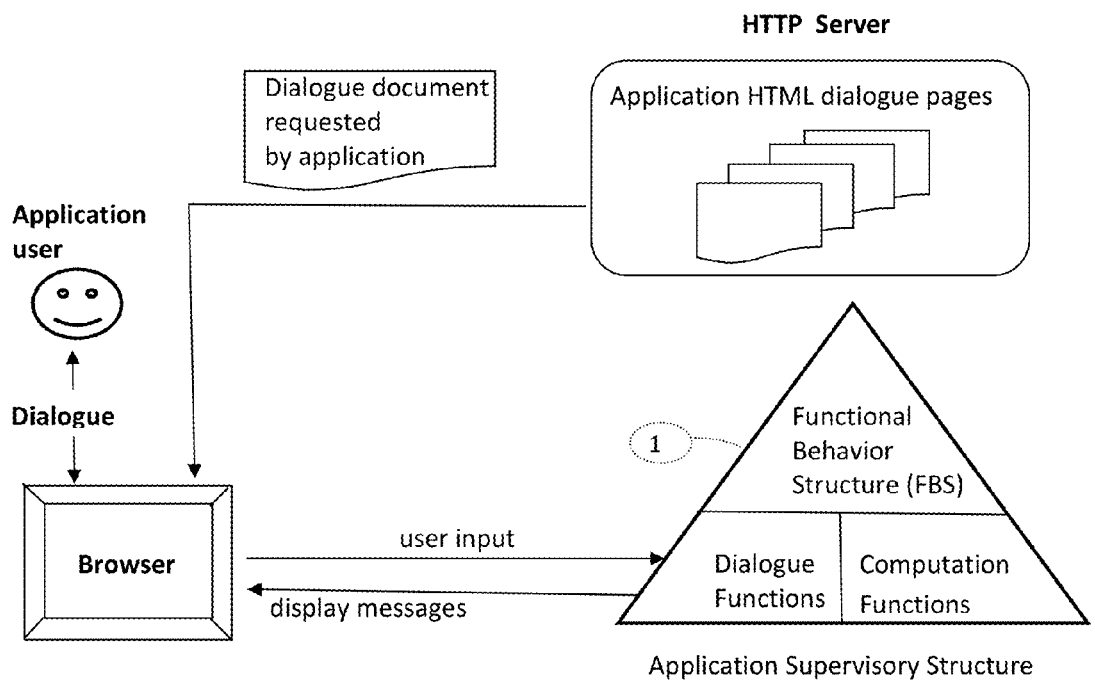
Figure 2. Execution of a WEB Application Program constructed as a Supervisory Structure.

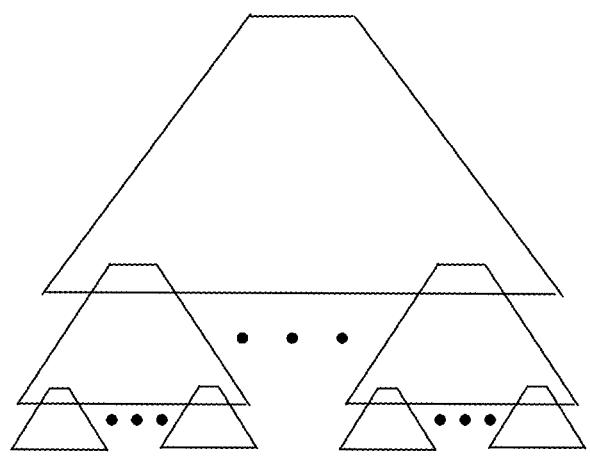
Figure 3. Supervisory structure composed of supervisory cells.
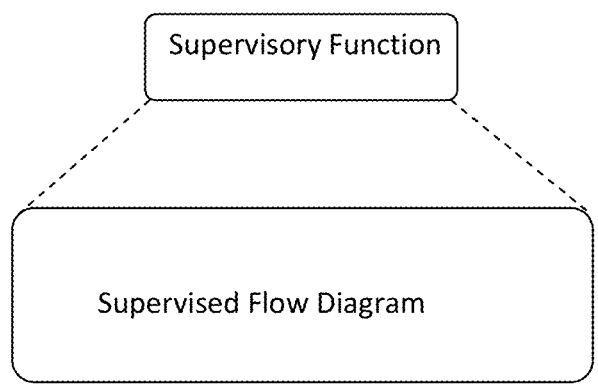
Figure 4. Supervisory cell of a supervisory structure.

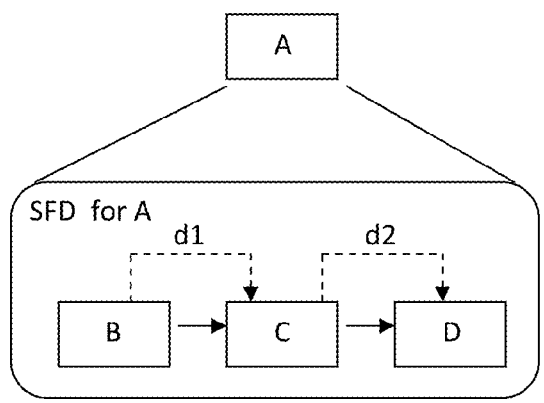
Figure 5. An example supervisory cell and its SFD.
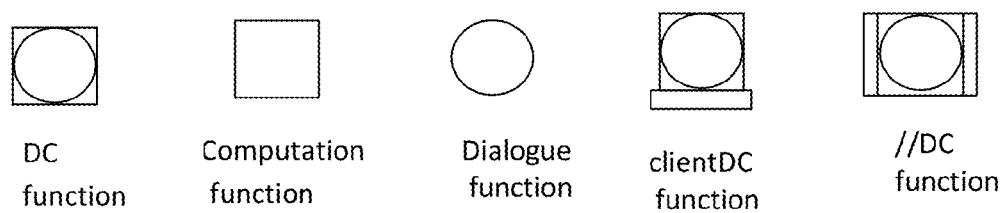
Figure 6. Function symbols of a WEB application program.

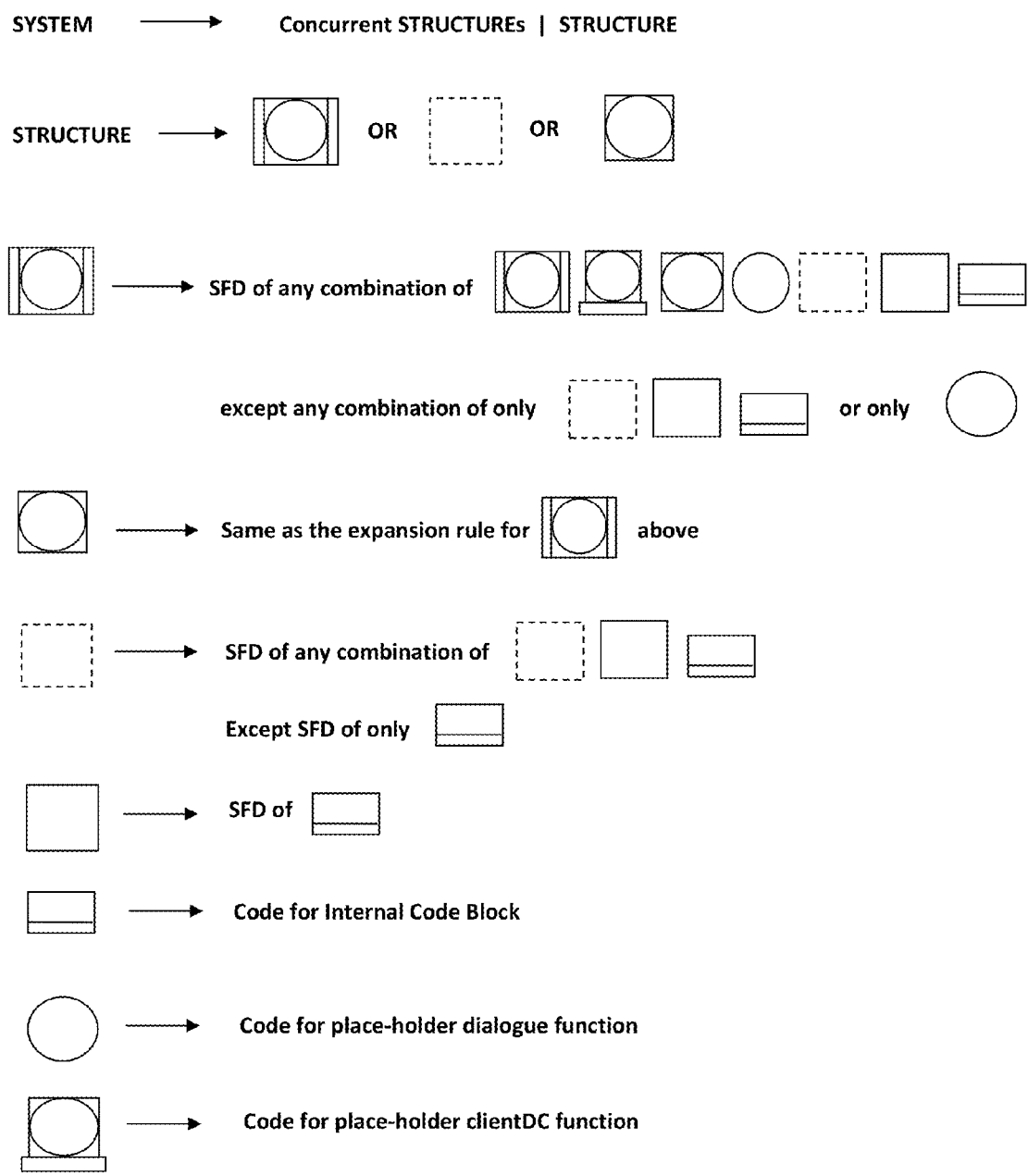
Figure 7. The grammar for the notational language for application server programs.

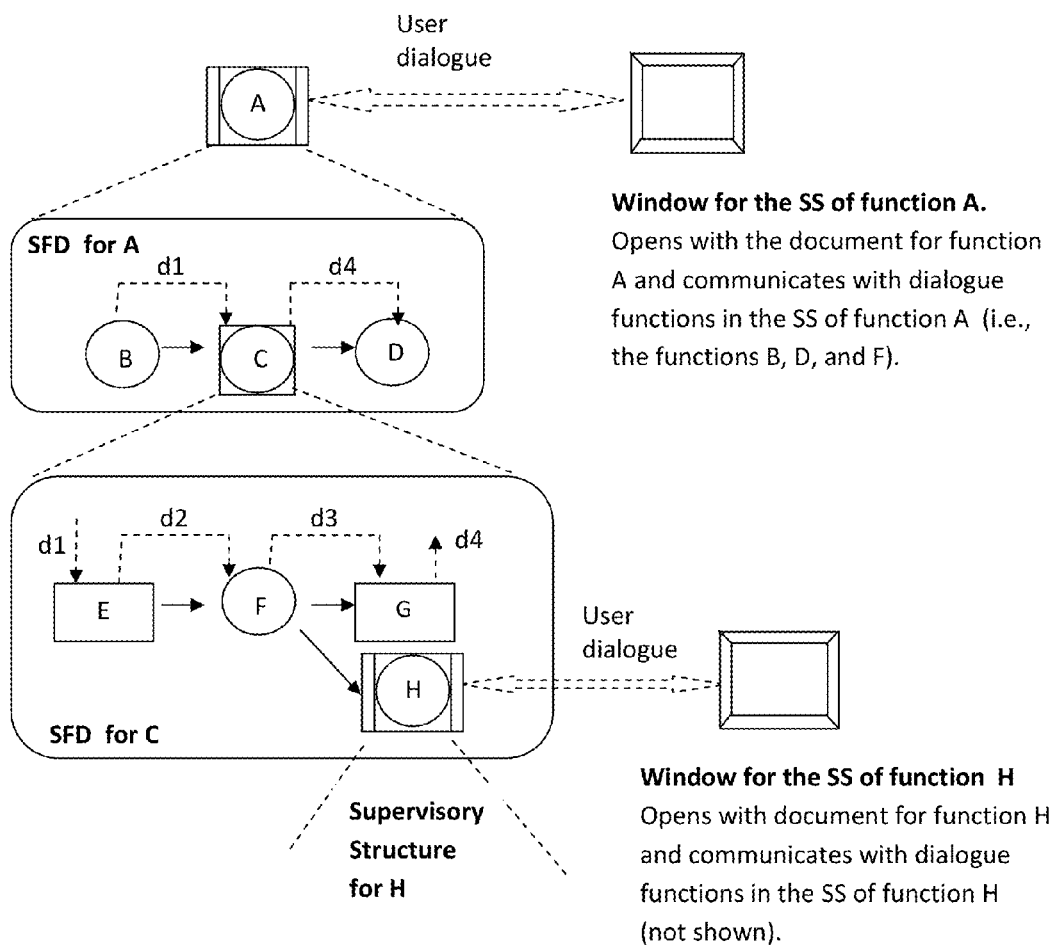
Figure 8. An example graphical interactive application program.

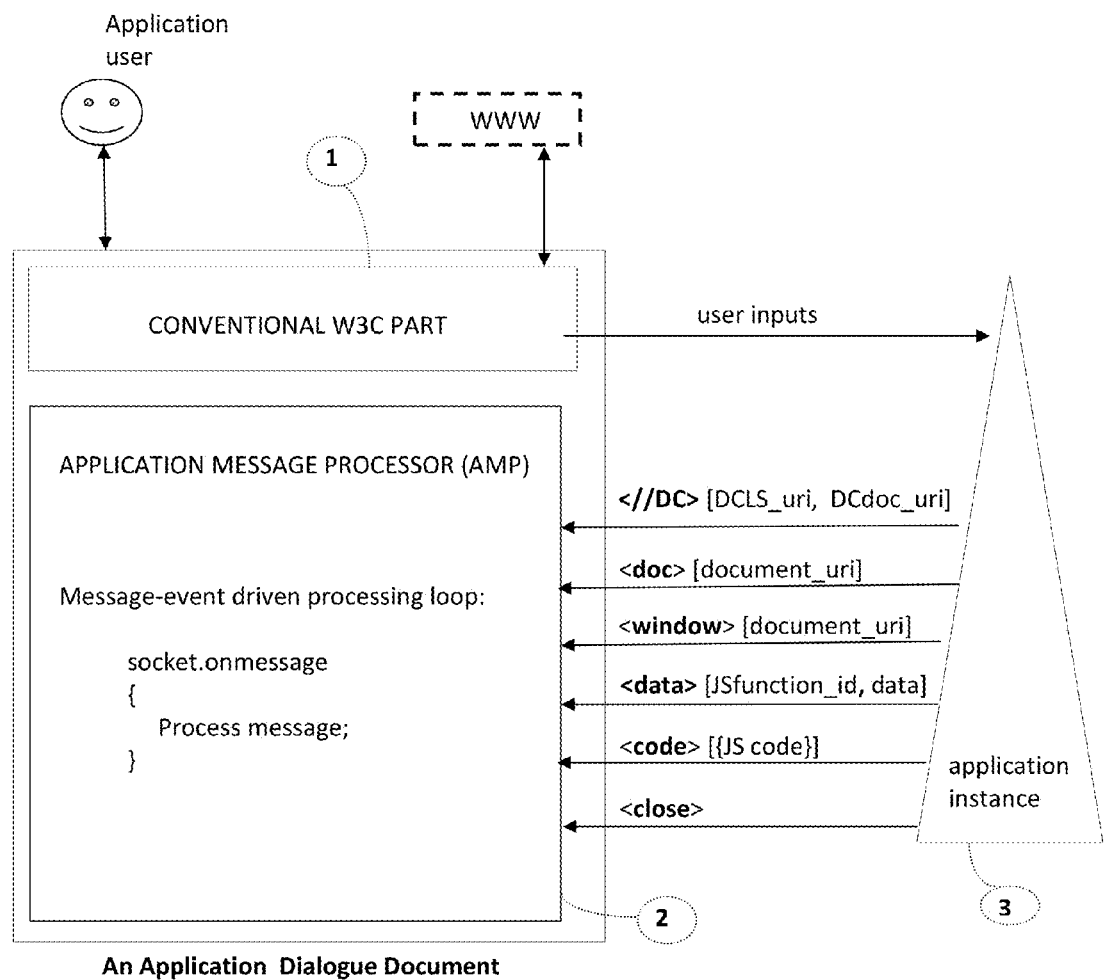
Figure 9. Dialogue document parts that communicate with an application instance.

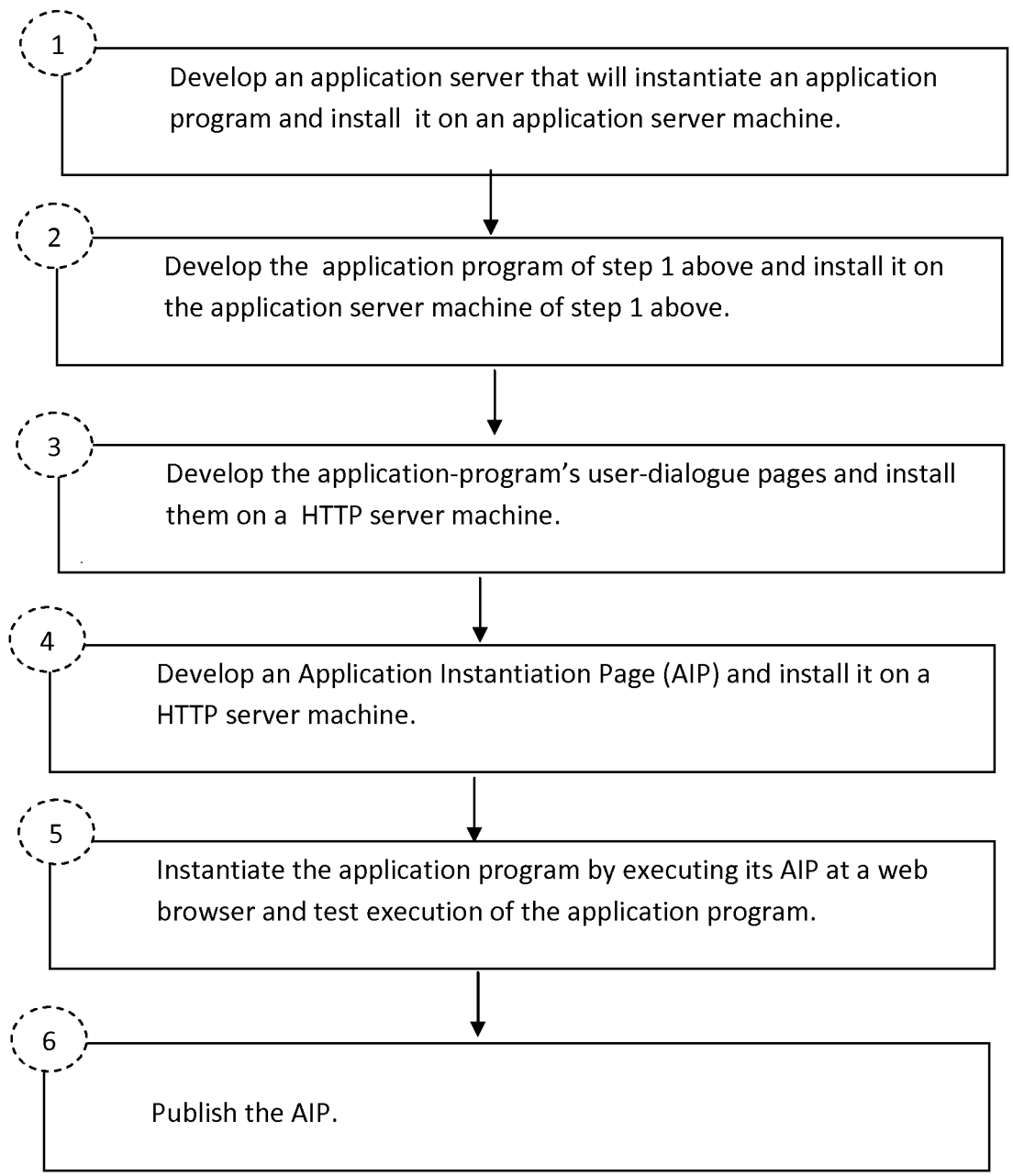
Figure 10. The process of creating a YWAPA web application system.

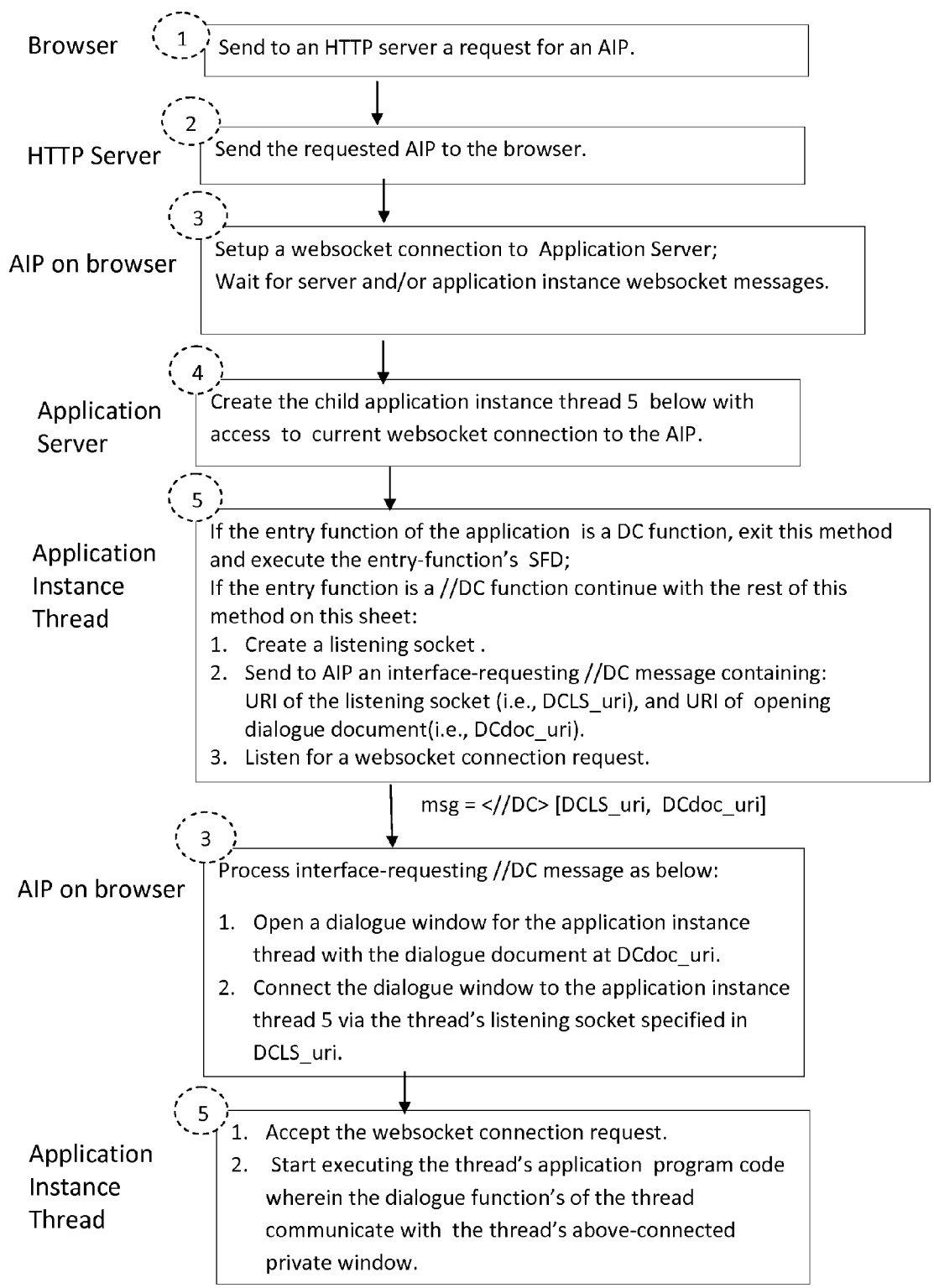
Figure 11. A method for Instantiating an interactive web application.

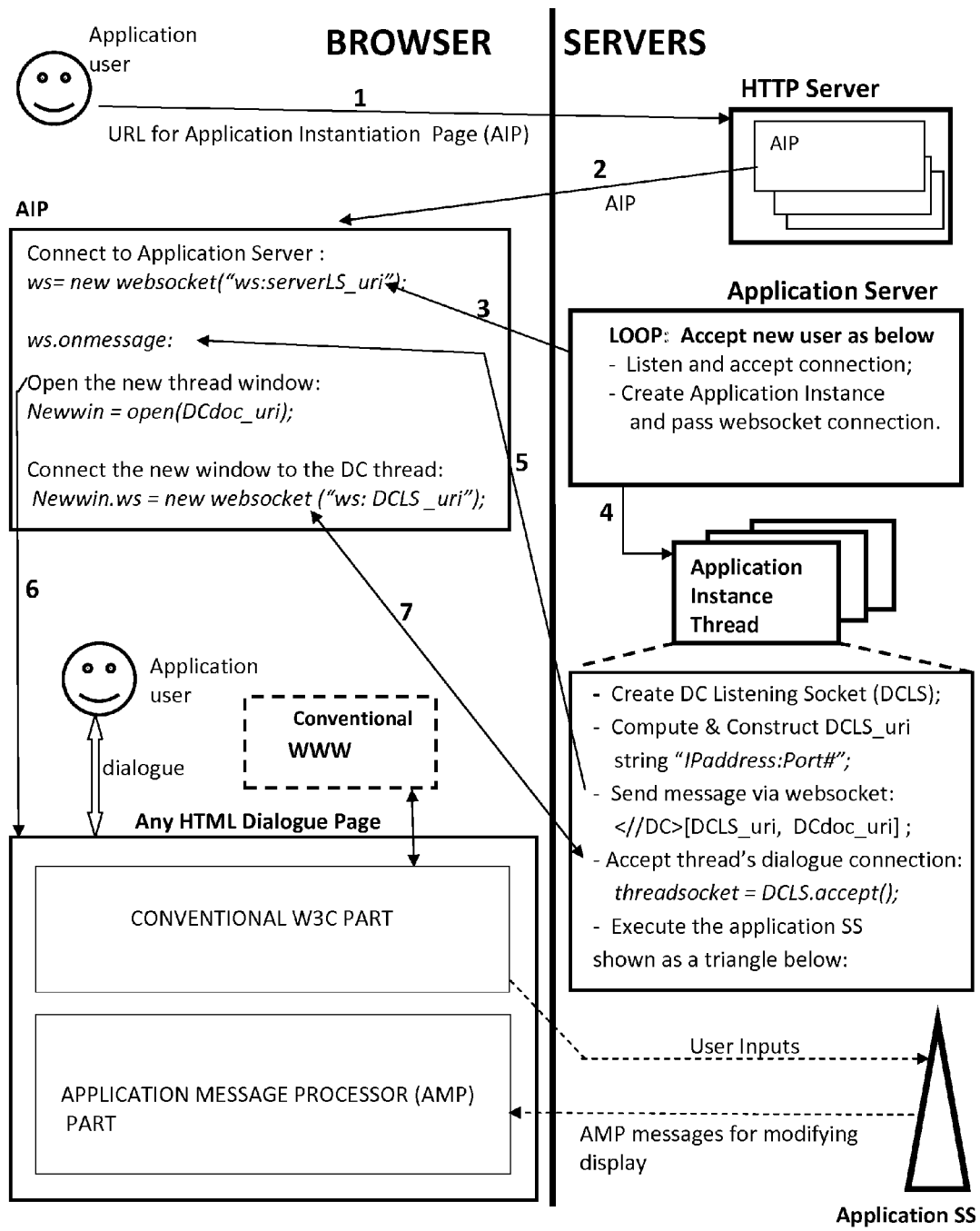
Figure 12. Example instantiation and execution of a web application.

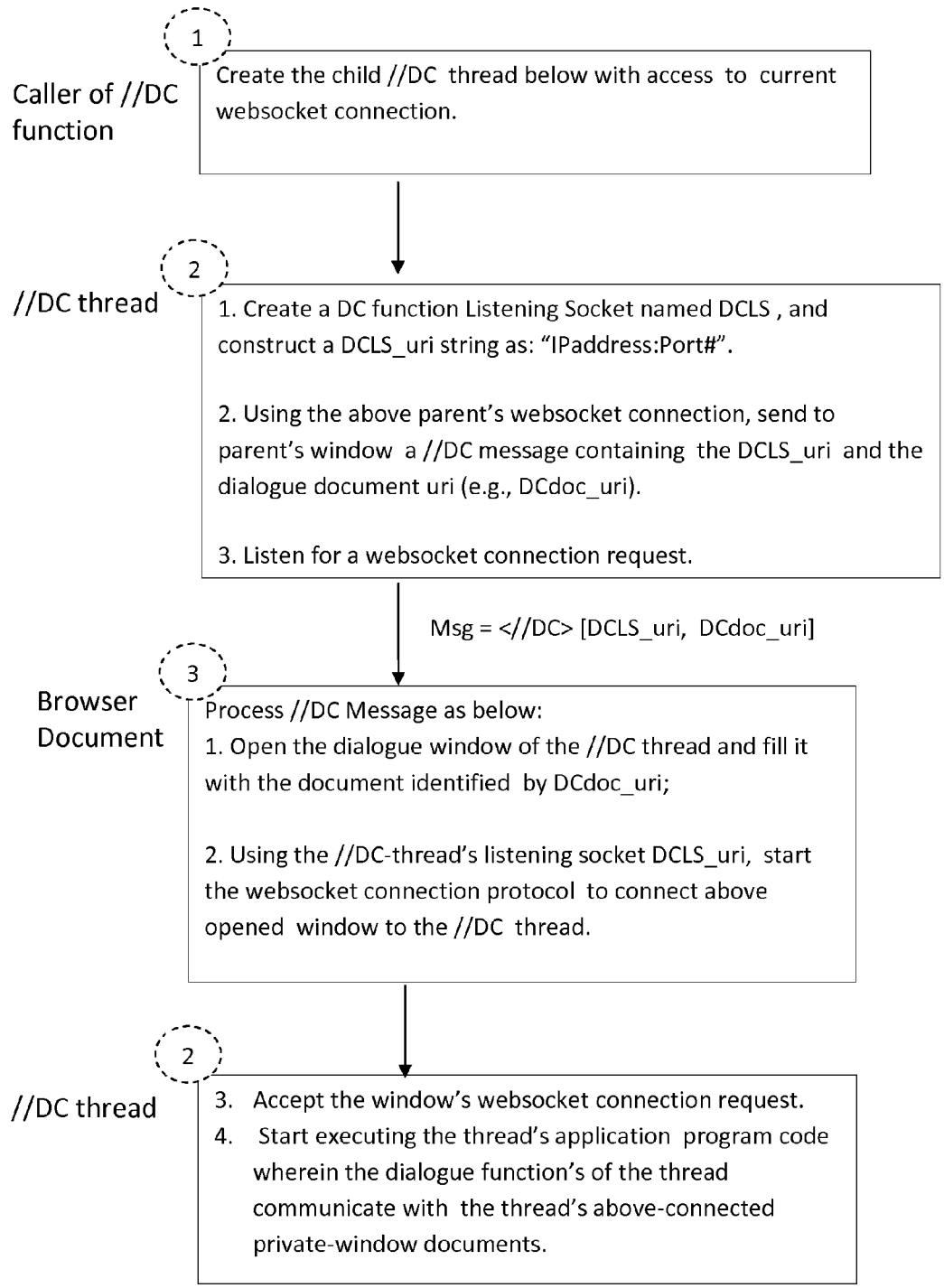
Figure 13. A procedural method for creating a //DC thread and its browser window.

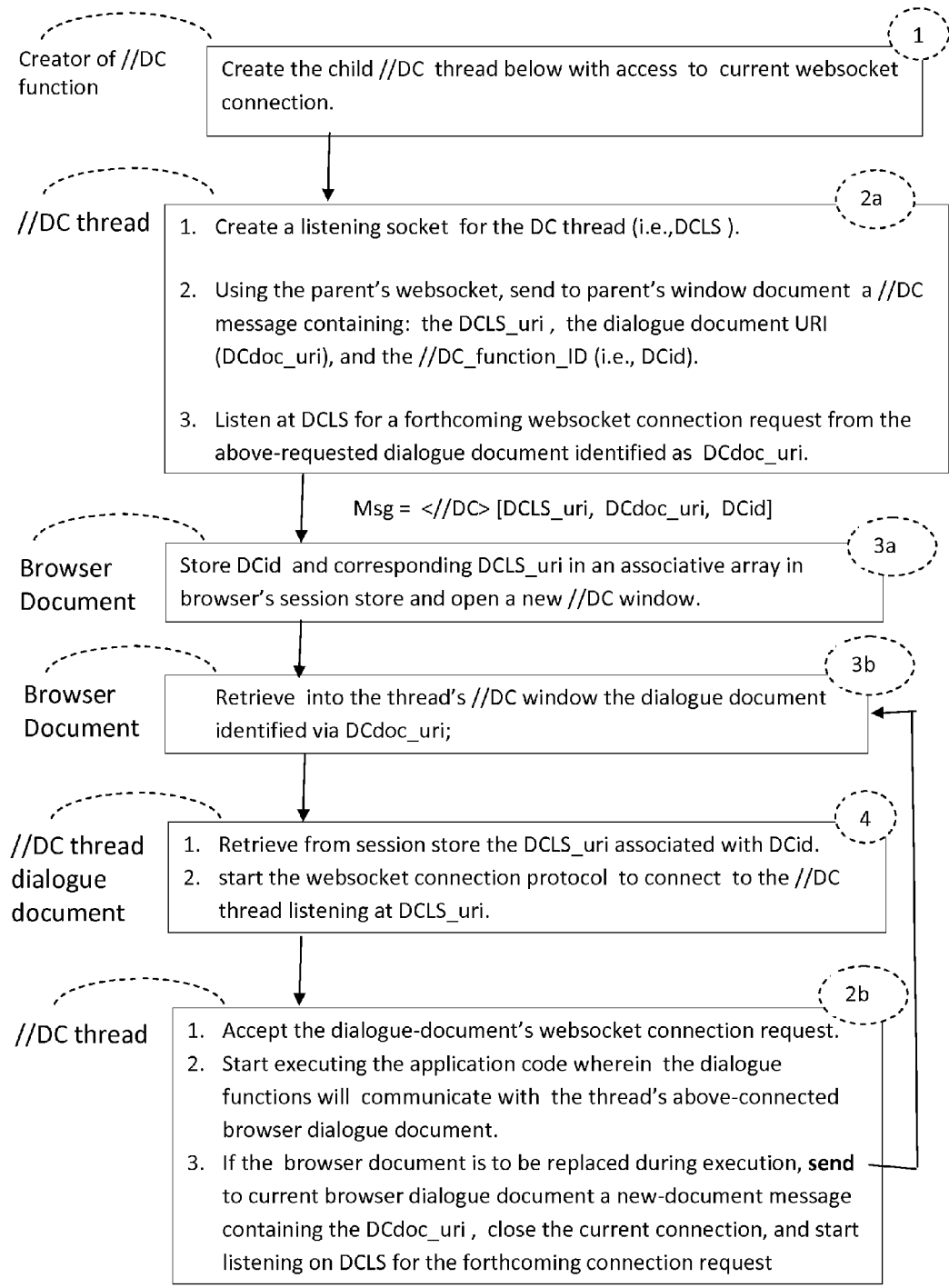
Figure 14. A method for creating a separate websocket connection for each document.

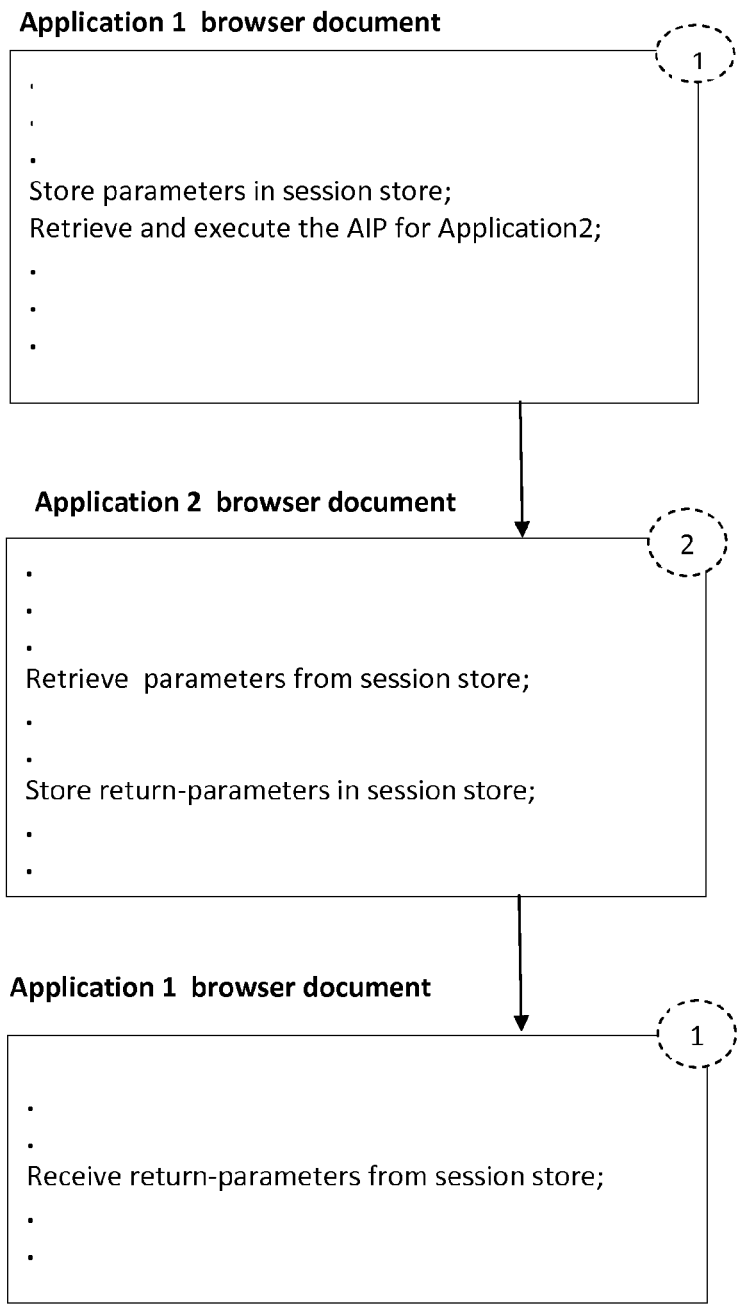
Figure 15. An application invoking an application with parameter communication.

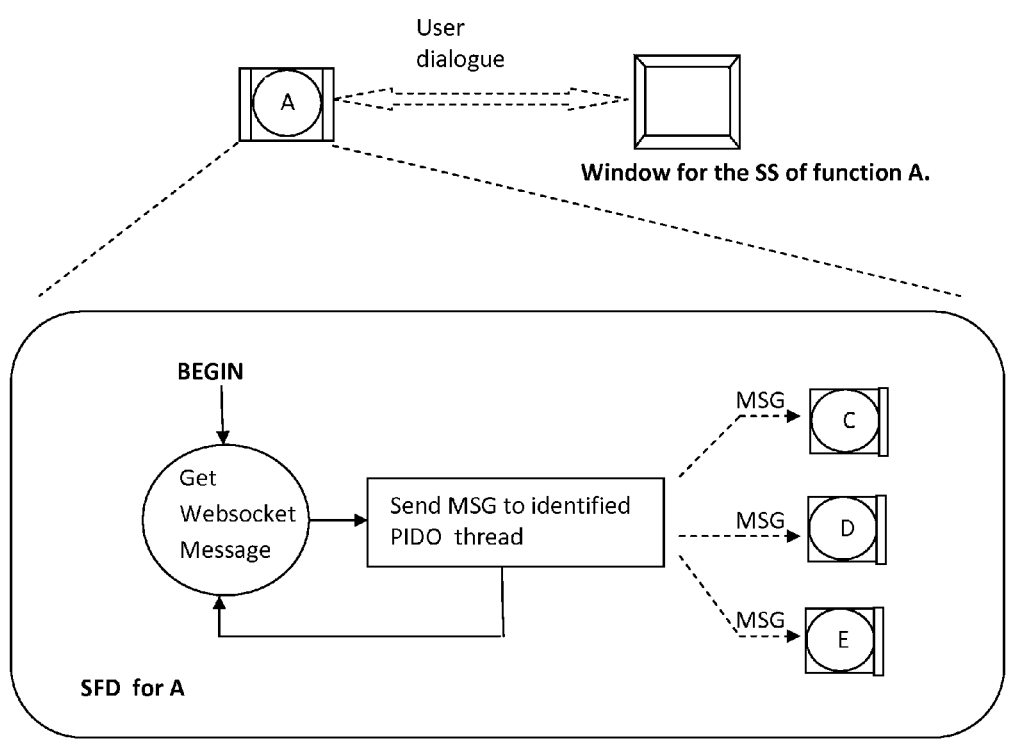
Figure 16. An example non-blocking //DC function loop-operation serving three document PIDO's.

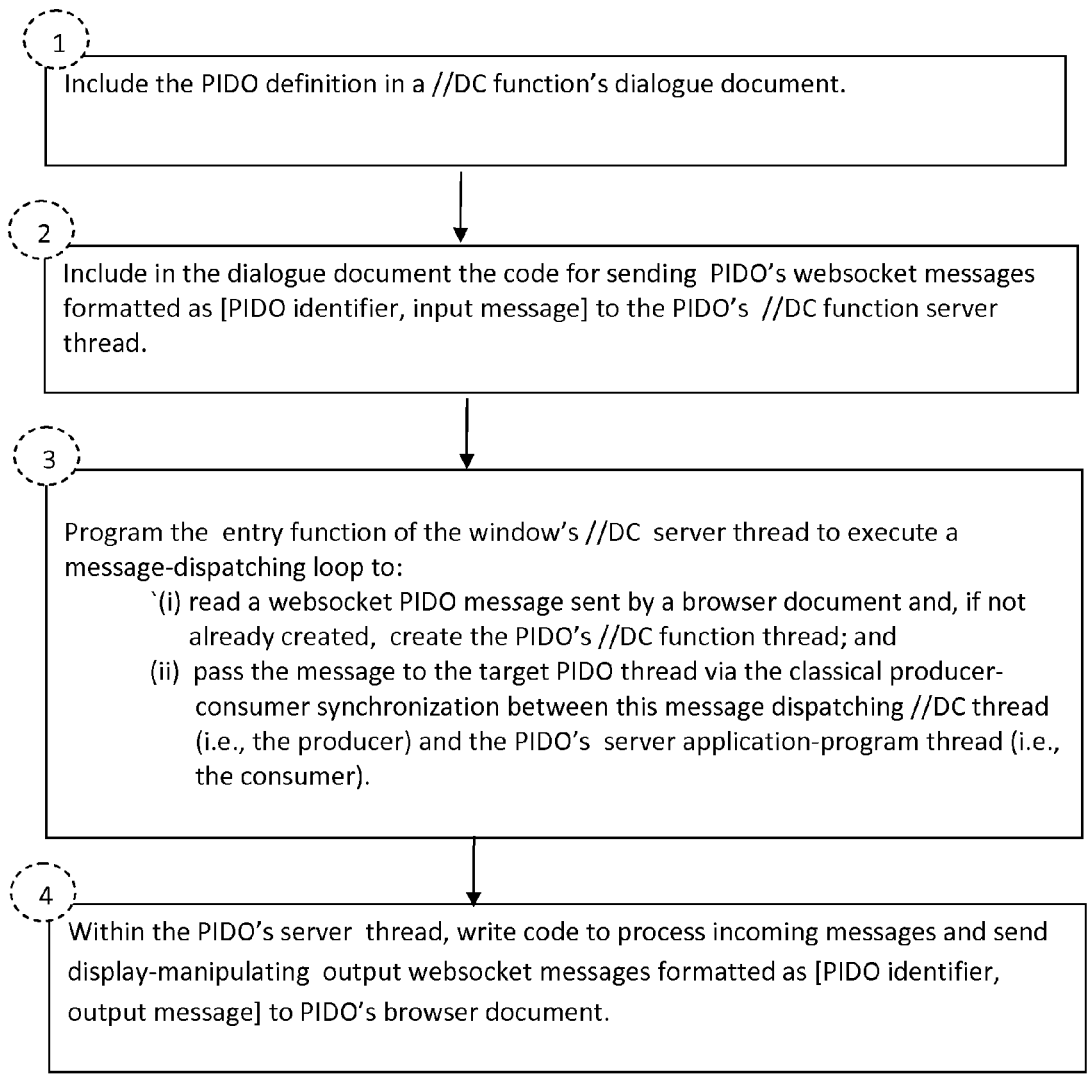
Figure 17. A method for implementing a PIDO in a web application.

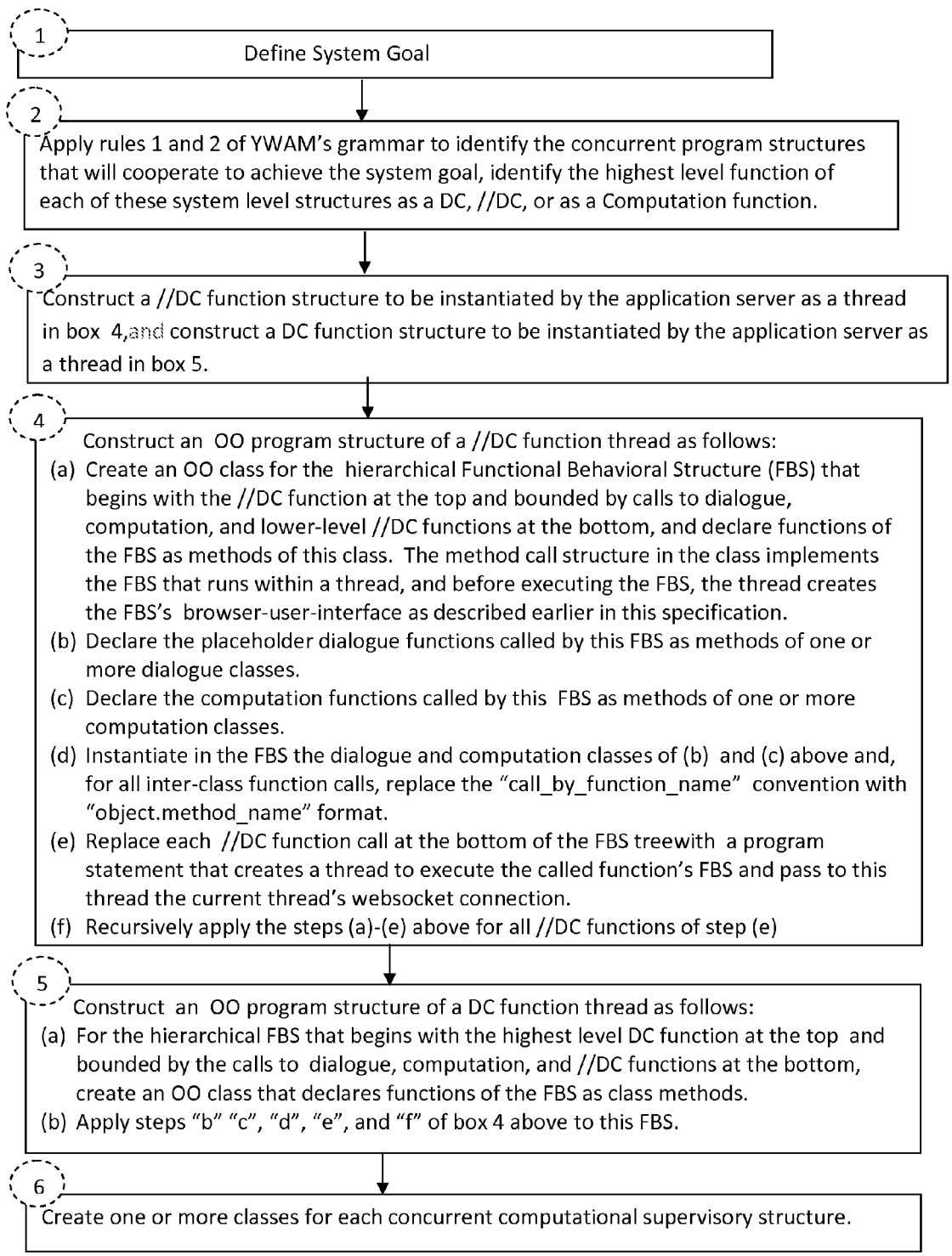
Figure 18. Developing an OO program in accordance with YWAM's grammar rules.

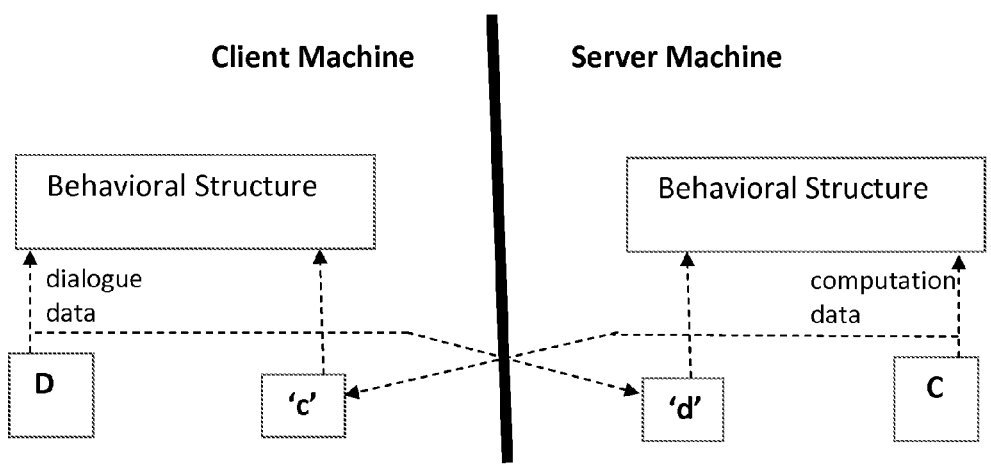
Figure 19. Dual SS application architecture.

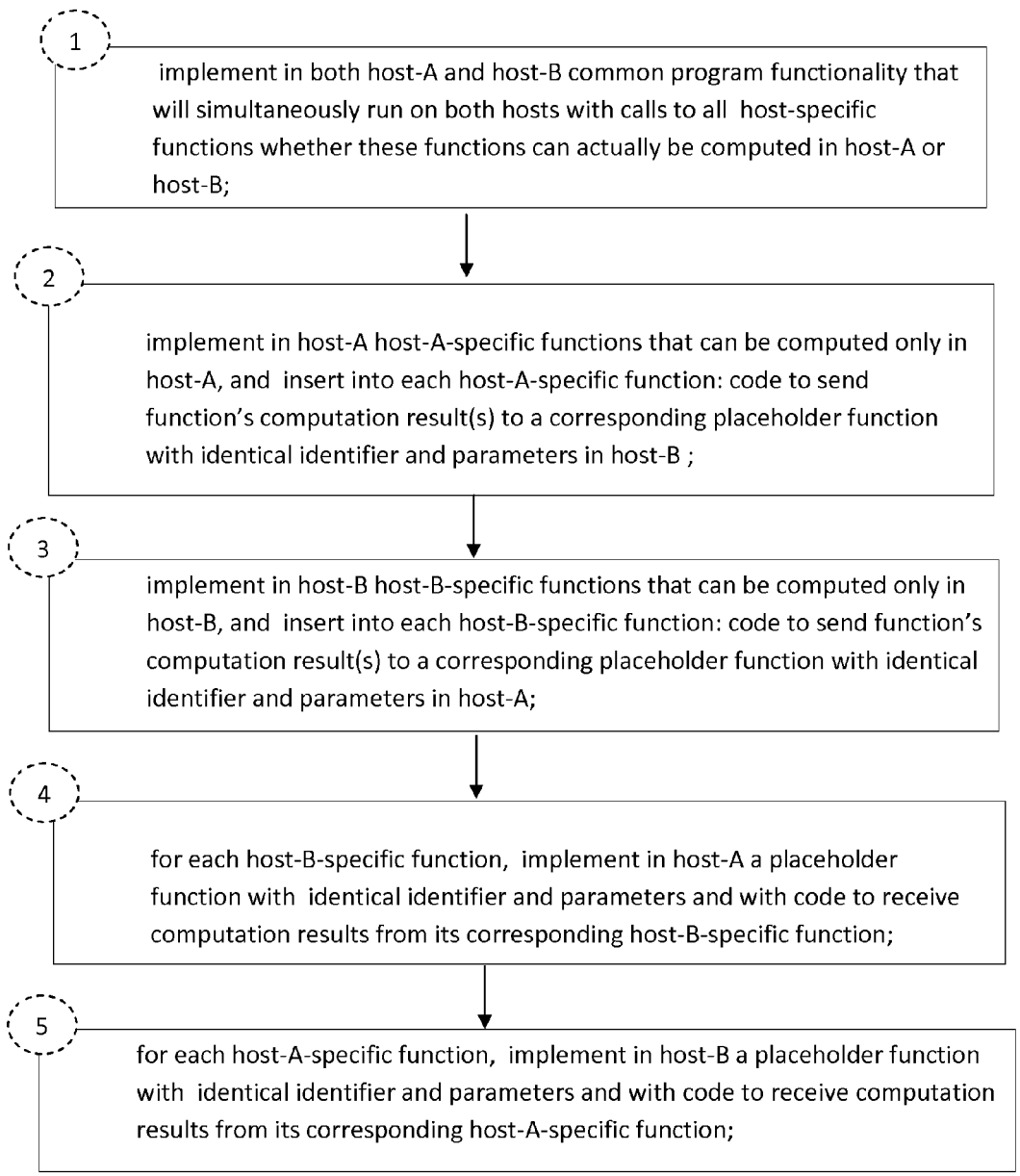
Figure 20. A method for implementing a program with dual-SS architecture.

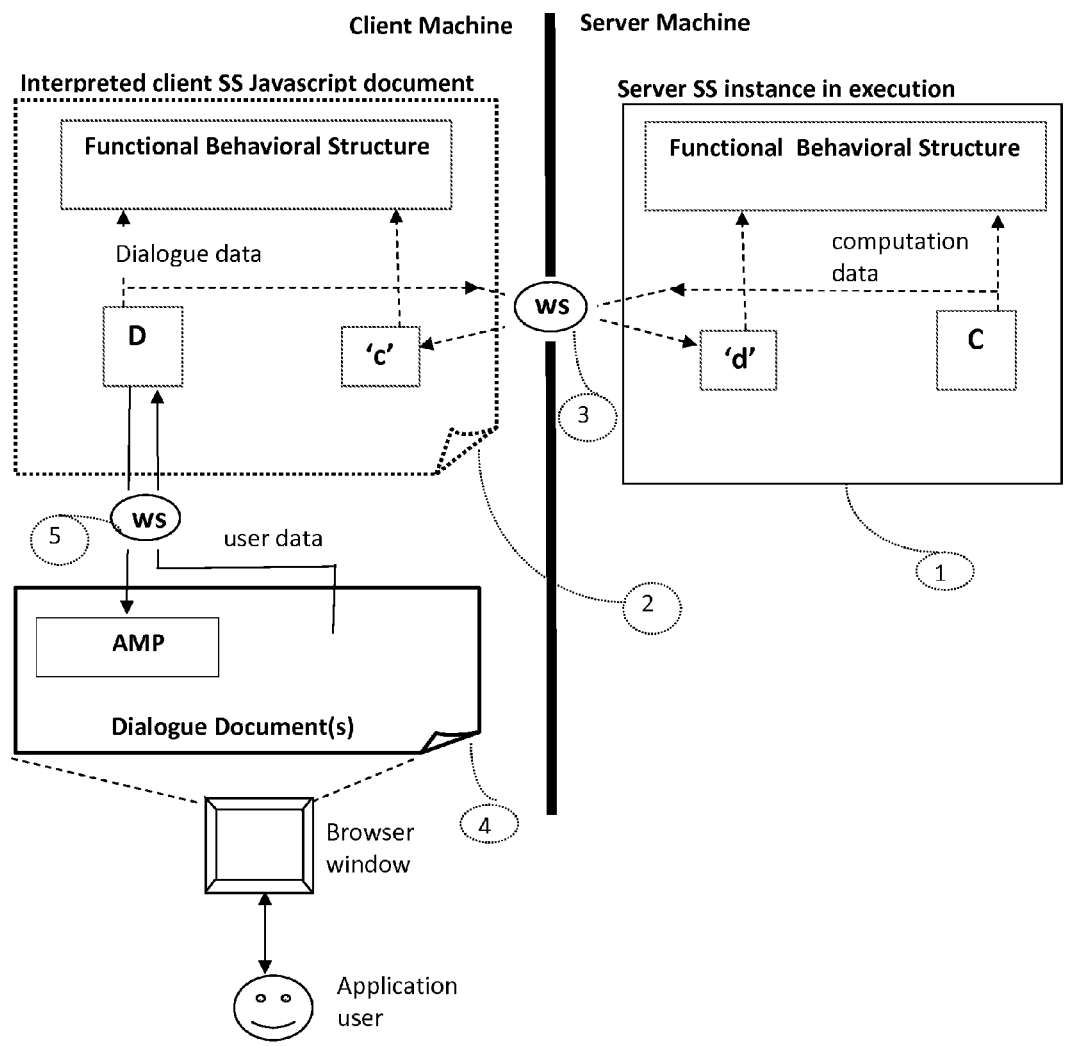
Figure 21. Execution of an application with Dual SS architecture.

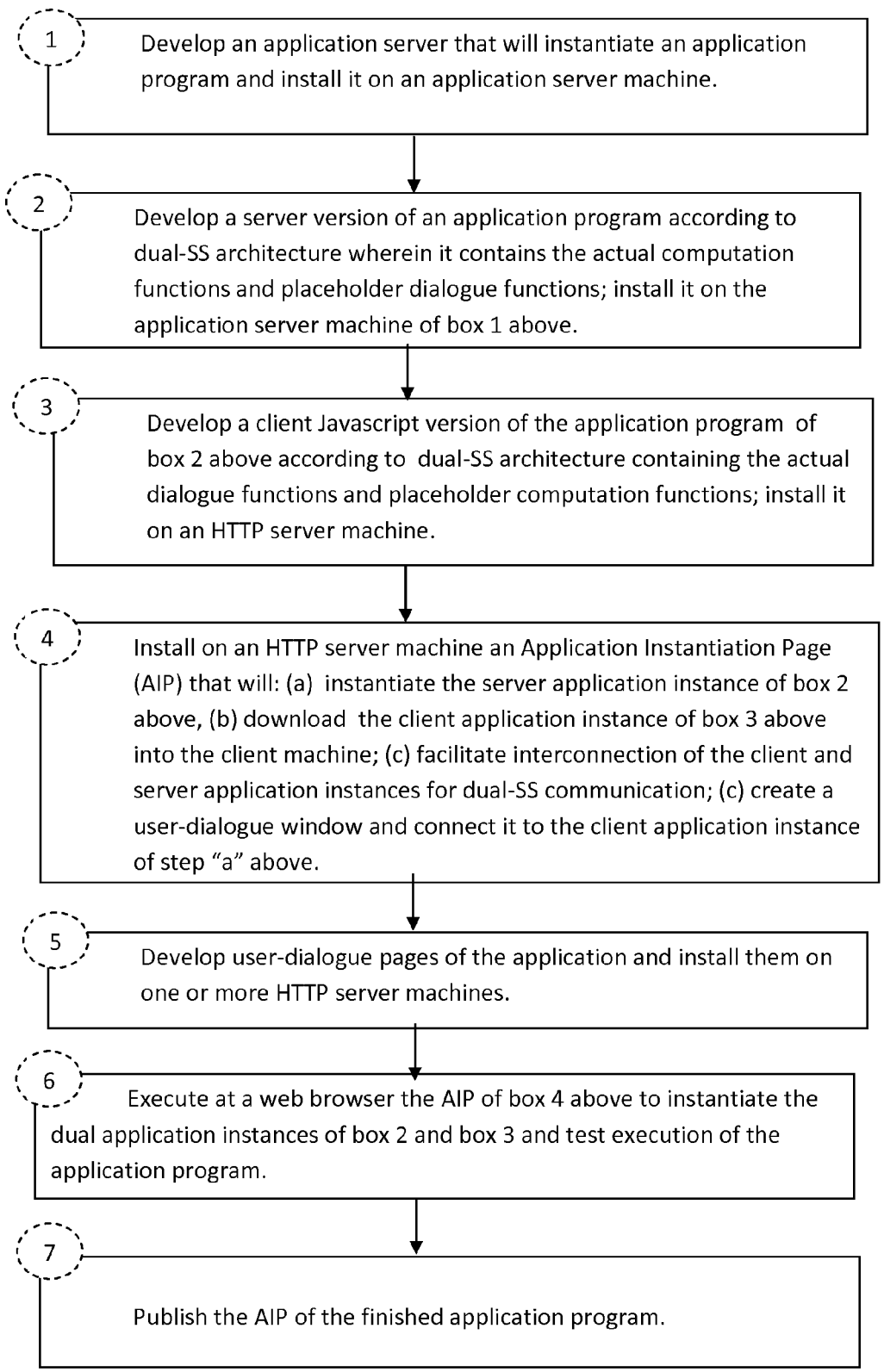
Figure 22. A method for developing a YWAM application with dual-SS architecture.

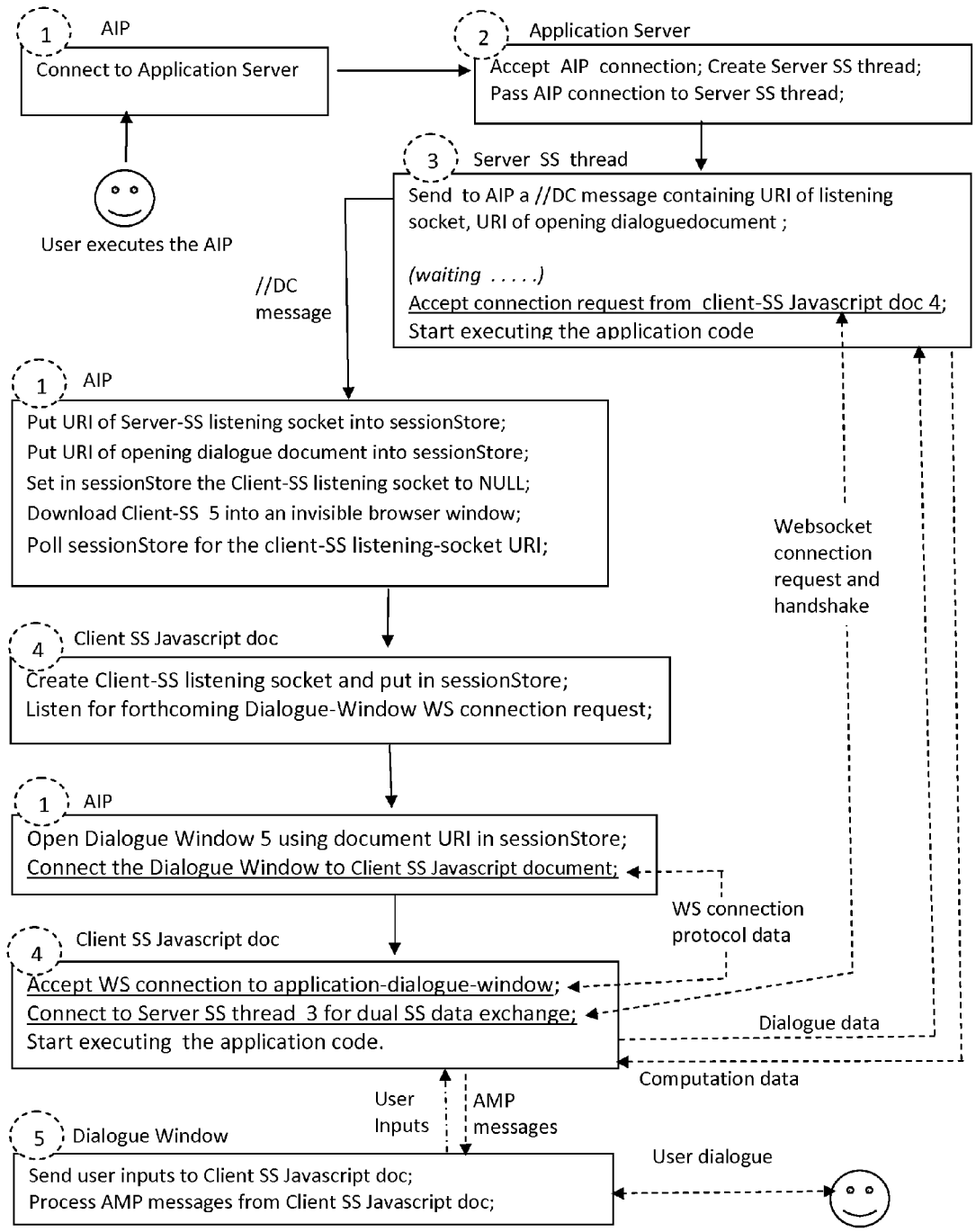
Figure 23. A method for instantiating and executing a YWAM application with dual-SS architecture.

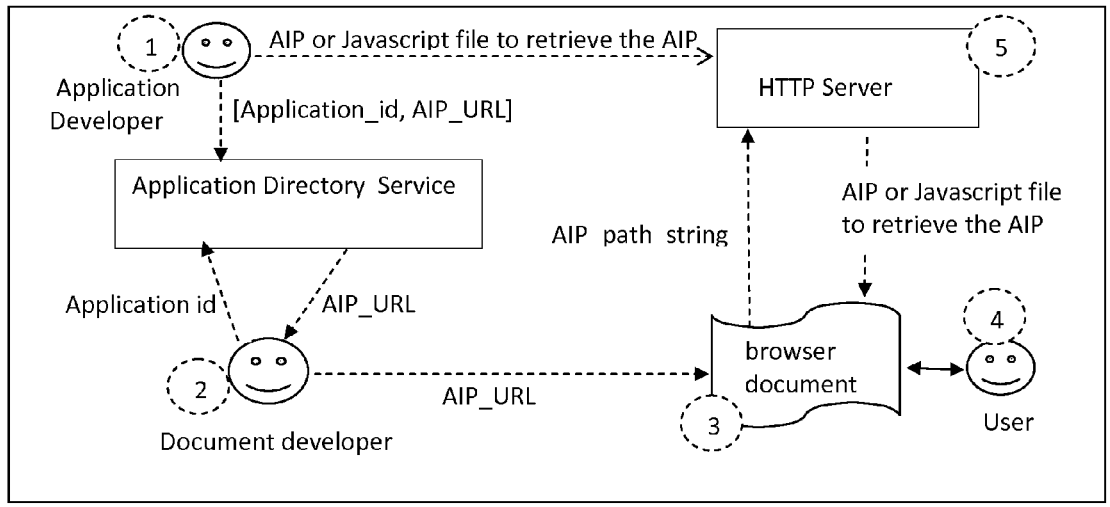
Figure 24.a   Registering and accessing an AIP via proprietary HTTP server(s).
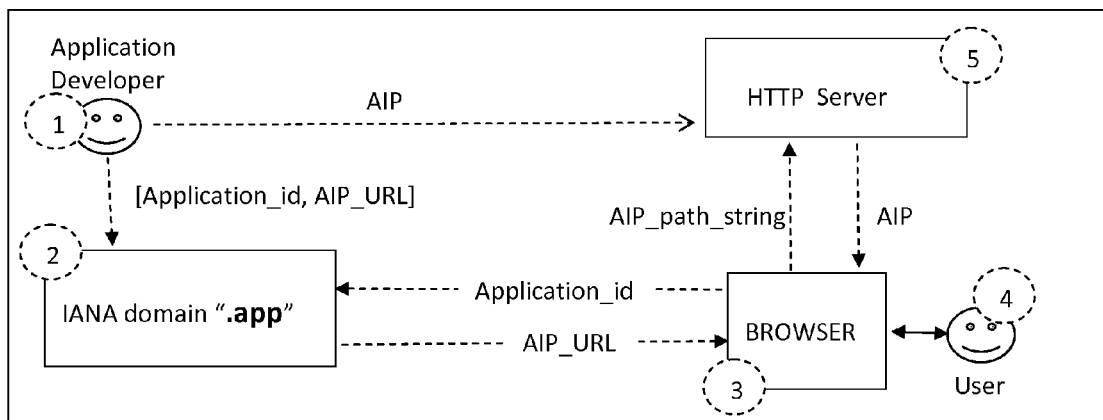
Figure 24.b   Registering and/or accessing an AIP via new IANA ".app" domain.
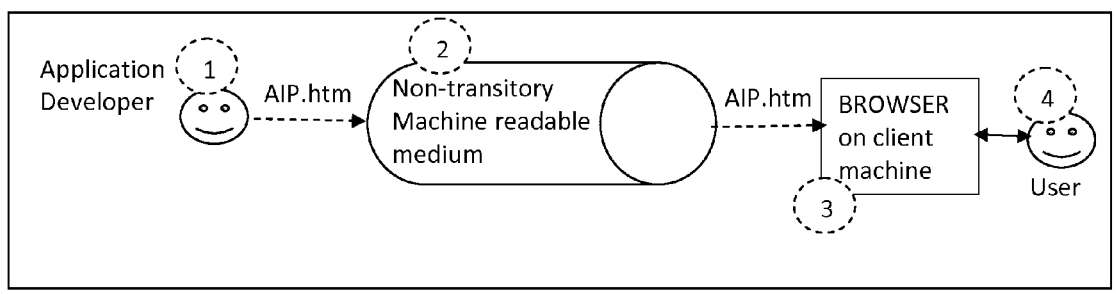
Figure 24.c   Using a portable external storage device for storing and accessing an AIP.

YUNTEN'S WEB APPLICATION METHODOLOGY AND WEB PROGRAMMING LANGUAGE (YWAM AND WPL)

Currently, there is not a comprehensive software engineering methodology for developing web applications. Most developers use ad-hoc approaches to application development and ignore the structured life-cycle based approaches of the software engineering discipline. For example, Microsoft's ASP.NET MVC recommends an application development technique called "scaffolding" for initially "generating a basic outline of your software that you can then edit and customize", and Microsoft MVC documentation comments on scaffolding as: "It saves you from the trauma of looking at a blank page and having no idea where to start!" This statement alone shows that developing a web application without an effective methodology may be a traumatic experience even for skilled software developers. Also, scaffolding may be an acceptable prototyping technique for small web applications but certainly will not help in developing large complex distributed applications such as multi-user-type enterprise applications, and, is not necessarily the best technique even for small web applications. Hence, a comprehensive methodology for developing web applications is needed.

In addition, the root cause of difficulties in most current web-application development practices is using the stateless HTTP document transfer protocol as a means for interacting with state-dependent computer-programs that utilize state-dependent user dialogue. The consequences are: (a) sophisticated and costly hacker-type approaches to application development, (b) ad-hoc development, or (c) cannot do it! On the other hand, HTTP is very much liked and it is everywhere, and all browsers use it. The solution then is: let the browser use the HTTP simply to serve its original purpose (i.e., for transferring user-dialogue documents), but let the browser use another channel for exchanging dialogue data with a stand-alone separate application program that manages its own state, and let this application program manipulate the contents of these dialogue documents through the browser while the browser by its nature (i.e., without even trying) preserves the state of the dialogue documents that it renders. This is exactly what YWAM of this invention does—it builds web application programs that implement the above-said operational model by using two different server types: HTTP server(s) and Application Server(s). This invention also integrates said methodology into a notational programming language specifically designed for developing web application systems.

SUMMARY OF THE INVENTION

The Yunten's Web Application Methodology (YWAM) develops hyperlink-accessible interactive network programs that use a web browser as a user-dialogue engine. FIG. 1 shows a high-level view of the execution of a web application developed by YWAM. As FIG. 1 shows, a client web browser interacts with two separate server types: Application Server 1 for instantiating an application instance 3, and HTTP Server 2 for delivering to the browser 4 the dialogue documents used by this application instance during its execution. These two servers can be in the same network machine or in different machines. When they are both on a user's personal computer, an application program becomes a PC program using the web browser as a GUI.

FIG. 1 is a generic operational view and a web application can also utilize a plurality of HTTP servers and a plurality of said application servers. This generic dual-server-type application program architecture illustrated in FIG. 1 will be referred to as Yunten's Web Application Program Architecture (YWAPA). Throughout this specification, the terms "YWAM application" and "YWAM application program" refer to a web application program built on YWAPA.

FIG. 1 shows that the dialogue functions of application program 3 are separated from the rest of the application program. Contrary to conventional practice, the dialogue functions of a YWAM application program do not directly communicate with the user. They communicate with the user indirectly through the browser dialogue documents retrieved from the HTTP server 2. The dialogue functions send application-to-user data to the browser dialogue documents and receive user-to-application data from the browser dialogue documents. In the embodiment presented in this description, the browser documents and the application dialogue functions communicate through websocket connection(s). For each direction of data flow, the dialogue functions also transparently perform the required translation between "text data" used by browser documents and the "binary data" used by the application instance. The dialogue functions also manage the form and content of the browser display via the messages that they send to the browser documents.

The browser dialogue documents served by an HTTP server are text documents written in HTML and a scripting language such as Javascript. On the other hand, the application programs hosted and instantiated by an application server can be written in any programming language based on the object oriented paradigm and/or a conventional functional decomposition approach. Typically, just like in conventional program development process, the source code for an application program is developed and compiled into binary machine language code, instantiated by the application server, and executed in binary machine code. However, if desired, an application program can also be written in an interpreted language. It should be obvious to the reader that YWAM can develop a large spectrum of web applications by using a casual operating system and may not require specialized platforms to support web application development.

It is important to see that the application instance 3 in FIG. 1 does not contain any HTML code or markup language code. When the application uses a web browser as a user-dialogue engine as in this description, the dialogue functions serve as dialogue placeholders in the application program structure and serve as a bridge between the application and the web browser documents that implement the actual user dialogue. It must also be noted that an application-program hosted at an application server may be a stand-alone program whose dialogue functions can be implemented using any user interface technology. With such applications, because application functionality is totally independent of and knows nothing about HTTP, HTML, and related scripting languages, the developer of a web-application who is not involved in user-dialogue design does not need to know these technologies.

A user accesses a YWAPA application via executing at his/her browser an Application Instantiation Page (AIP) retrieved from a HTTP server. An AIP is also called Service Access Page (SAP) and these two terms are used interchangeably throughout this specification.

The AIP knows (or finds out) the URL of the application server listening socket it will connect to. The AIP connects to the application server which in response instantiates (e.g., at the server machine) an interactive program instance. This program instance and AIP together open at the client machine the user's interface to said program instance. This program instance can be the totality of the application program or it can be a part of the application program. The application server on the other hand can be a very simple program loop listening for AIP connection requests and creating a running copy of said interactive program instance for each connection request.

Any developer can install and serve an application on any network machine(s), even on his/her own PC, and an application is free to use any HTML document in any machine(s) in the world accessible by a browser. Publishing an application then is simply publishing the URL of its AIP.

A YWAM application-program instance can run at the application server machine, it can run at the client machine, or if the dual-program architecture described later in the detailed description below is used, it can simultaneously run at both the client and the server machines. If the developer wishes, he/she can develop an application as a mix of the YWAM's program architecture and current W3C technologies.

Separating the stateless HTTP protocol from application design also opens the doors for application design via established disciplined software engineering practices and methodologies rich with features for developing high quality software. The detailed YWAM embodiment in the description below extends with the concepts outlined above the "SUPERvisory Methodology And Notation (SUPERMAN) for Developing Human-Computer Systems". (SUPERMAN is the inventor's doctoral dissertation—see references: 1, 2).

Following is the list of figures used in this description:

FIG. 1. A high-level view of execution of a WEB application.

FIG. 2. Execution of a WEB Application Program constructed as a Supervisory Structure.

FIG. 3. Supervisory structure composed of supervisory cells.

FIG. 4. Supervisory cell of a supervisory structure.

FIG. 5. An example supervisory cell and its SFD.

FIG. 6. Function symbols of a WEB application program.

FIG. 7. The grammar for the notational language for application server programs.

FIG. 8. An example graphical interactive application program.

FIG. 9. Dialogue document parts that communicate with an application instance.

FIG. 10. The process of creating a YWAPA web application system.

FIG. 11. A method for Instantiating an interactive web application.

FIG. 12. Example instantiation and execution of a web application.

FIG. 13. A procedural method for creating a //DC thread and its browser window.

FIG. 14. A procedural method for creating a separate web-socket connection for each document.

FIG. 15. An application invoking an application with parameter communication.

FIG. 16. An example non-blocking //DC function loop-operation serving three document PIDO's.

FIG. 17. A method for implementing a PIDO in a web application.

FIG. 18. Developing an OO program in accordance with YWAM's grammar rules.

FIG. 19. Dual SS application architecture.

FIG. 20. A method for implementing a program with dual-SS architecture.

FIG. 21. Execution of an application with Dual SS architecture.

FIG. 22. A method for developing a YWAM application with dual-SS architecture.

FIG. 23. A method for instantiating and executing a YWAM application with dual-SS architecture.

FIG. 24.a Registering and accessing an AIP via proprietary HTTP server(s).

FIG. 24.b Registering and/or accessing an AIP via new IANA ".app" domain

FIG. 24.c Using a portable external storage device for storing and accessing an AIP.

DETAILED DESCRIPTION

The detailed YWAM embodiment presented in this description extends SUPERvisory Methodology And Notation (SUPERMAN) for Developing Human-Computer Systems [1, 2]. As such, YWAM inherits a full lifecycle methodology built into a Graphical Programming Language (GPL). For clarity of presentation, this description will also utilize the GPL notation which will be briefly described below. Other embodiments of the invention will be apparent to those skilled in the art from consideration of the specification and practice of the invention disclosed herein. The specification and examples are as exemplary only, with a true scope and spirit of the invention being indicated by the claims submitted with this description.

For clarity of presentation, the remainder of this description is divided into the following subsections:
Application Program Structure;
Browser-Document Structure and Dialogue Data Flow;
Application Instantiation Page (AIP);
Details of Creating and Executing an Application;
Accessing an Application within an Application With Parameter Passing
User Friendly Responsiveness;
Scalability For Serving Large User Population;
Function Allocation Between the Client and the Server;
YWAM and MVC;
Publishing/Registering an Application;
YWAM's Dual SS Architecture;
Wider Scope of the Invention Obvious to Persons of Ordinary Skill in the Art;
REFERENCES.

Application Program Structure

FIG. 2 shows the execution of an application program developed via this YWAM embodiment that inherits and extends SUPERMAN. In FIG. 2, the generic application structure 3 of FIG. 1 is replaced with the interactive Supervisory Structure (SS) 1 of the parent methodology. As observed in FIG. 2, an SS is a tree structure consisting of a Functional Behavior Structure (FBS), dialogue functions, and computation functions. The FBS supervises the sequencing of and data communication among the dialogue and the computational functions, and the dialogue functions communicate with the browser dialogue documents which in turn communicate with the user. The FBS part of an SS is developed in the Requirements Specification phase of the software lifecycle. The dialogue and computational structures of an SS are developed in the design phase of the software lifecycle. If the developer develops the SS via the graphical programming language of the methodology, the whole SS is graphical code that is compiled into executable binary code. Hence, an application-program's supervisory structure integrates into a single representation the products of the Requirements Specification, Design, and Coding phases of the software lifecycle and eliminates costly and error-prone specification transformations through these phases.

To fully understand this YWAM embodiment, in addition to the SS components briefly described in the above paragraph, the reader needs to know some other parent methodology characteristics inherited by this embodiment. These are outlined in the following eight short paragraphs preceding the paragraph that starts with "Dialogue function". The material discussed after that is new and is specific to YWAM (unless it is stated otherwise).

FIG. 3 shows that an interactive software program is constructed as a tree structure of supervisory cells called a Supervisory Structure (SS), and an application may be composed of a plurality of communicating supervisory structures.

FIG. 4 shows that a supervisory cell, the building block of an SS, consists of a supervisory function (which specifies the function's goal) and a Supervised Flow Diagram (SFD) that specifies the operation of the supervisory function in achieving its goal.

FIG. 5 shows an example supervisory cell consisting of the supervisory function A and a very simple SFD.

The SFD in FIG. 5 shows the procedure executed by the supervisor A, and also shows both control flow and data flow. The solid arrows in the SFD show the sequence in which the supervisor A calls the functions B, C, and D. The dashed arrows show the data that the supervisor receives from the SFD functions (i.e., d1 from B, d2 from C) and the data that the supervisor passes to the SFD functions (i.e., d1 to C, d2 to D). The Graphical Programming Language compiler of YWAM would translate this supervisory cell into:

```
Function A( ) {
B(out:d1);
C(in:d1; out:d2);
D(in:d2);
}.
```

The example in FIG. 5 showed a typical supervisory cell that corresponds to what is conventionally known as a procedure, a method, or a function object. In a broader context however, a supervisory function is a placeholder for the designer's mind, and the SFD is meant to represent the operations the designer envisions in his/her mind. Hence, this ability for notational representation of operations envisioned by a designer makes possible the development of a highly expressive graphical programming language. For example, the notation for a function might indicate that the function will execute asynchronously. Likewise, the notation for a function may imply that the function will do certain things before executing its SFD and/or after executing its SFD.

A conventional (i.e., pre-WWW) interactive-software supervisory structure may contain three function types: Dialogue-Computation (DC), computation (C), and dialogue (D). YWAM extends this list with new function types: clientDC function, parallel DC (//DC) function. FIG. 6 shows the graphical symbols for these functions. These functions types are discussed below.

Dialogue-Computation (DC) Function—

A DC function is an interactive function performed by the user and the computer together. It is a high-level software function, the SFD of which may contain other lower-level DC functions, dialogue functions, and computation functions. A structure of DC function supervisory cells show the functional cooperation of the user and the application through abstract levels, and specify user requirements through functional decomposition. As indicated in supervisory structure 1 of FIG. 2, this upper portion of a supervisory structure is called the Functional Behavioral Structure or FBS. A conventional FBS is a tree structure of DC functions the bottom of which is bounded by the calls to dialogue and computational functions.

Computation Function—

This is a function which will perform only a computation. A computation function cannot communicate with the user. It can communicate with the DC functions of the FBS and/or with the computation functions of the same or other supervisory structures. Typically it receives its inputs from a DC function that invokes it (e.g., calls it) and gives the computation results back to the same DC function or to another computation function. In a client-server environment, the computation functions reside and execute at the server machine. The SFD of a supervisory computation function can call lower-level supervisory and/or worker computation functions.

Dialogue Function—

In the eyes of an observer of a program's supervisory structure, this function provides for the communication between the user and the application program (e.g., between the user and the DC functions). However, because YWAM uses browser documents for user interaction, this SS function does not communicate with the user. It serves as a dialogue placeholder in the SS and it provides for dialogue data flow between its supervisory function in the SS and a browser document that performs the actual communication with the user. In this embodiment, a dialogue function communicates with the browser documents via websocket messages. A dialogue function also performs data type conversion for data exchanged with the browser documents. Because Javascript is a typeless language and uses strings, a dialogue function does type conversion for both data-flow directions (e.g., converts an application data of a given type to a text string before sending to the browser, and converts the text string data received from the browser to the corresponding application data type before passing it to the calling supervisor). A dialogue function can also perform dialogue-related server-side-processing of dialogue data. The SFD of a supervisory dialogue function can call lower-level supervisory or worker dialogue functions.

clientDC Function—

This is a new function type specific to YWAM. It has the same semantics as a DC function but it runs at the client machine. The main purpose of this function is to reduce the work load of the server machine. This function type is used for interactive computations which can be performed at the client machine without the need for external information. At the serve machine however, just like a dialogue function, this function is a placeholder in the application program structure. When it is called at the server, this placeholder version receives its input parameters form the caller, activates the actual function at the client machine, receives the output parameters from the client machine, and passes them to its caller at the server.

Parallel DC (//DC) Function—

This is a new DC function type specific to YWAM. An example of this function is the top-most DC function of an interactive SS object that executes (e.g., at the server) as a thread (or a process). The dialogue functions of a //DC function communicate with the user through this function's private user interface (e.g., a browser window). A //DC function can contain lower level //DC functions in its structure. During execution of an application, an encounter of a //DC function results in creation of an executable thread object whose entry point is the encountered //DC function. The intent of a //DC function is to execute its own supervisory structure but first it must create and connect to its browser user interface. For this, it opens a listening socket and sends to its creator's browser window a "//DC" message that specifies this listening socket and also carries the specification for the function's browser user interface (e.g., window specs and the document URL—for simplicity, this document will assume that the browser user interface for a //DC function is a standard browser window). In response to a //DC message, the creator's browser window opens a new window for the //DC function's thread and connects this window to the thread via the thread's listening socket. After the socket connection is established, the //DC function executes its supervisory structure. The dialogue functions in the SS of this function communicate with the documents of this private window using this socket connection. As described above, a call for a //DC function is not a conventional function call but is a placeholder for a protocol which first creates a new execution-time abstract object consisting of a new browser window connected via a new websocket connection to a new thread containing the called function, and next executes the function's code encapsulated in the thread of this object. This protocol is called Dual Server Web Application Protocol (DSWAP) or simply //DC protocol.

The reason a //DC function is named as such is that it is a stand-alone execution unit and more than one of these functions might be running in parallel (e.g., as a thread or a process) while each one is communicating with its own private window on the display screen. Hence, the //DC functions are used to provide the application user with multiple concurrent interfaces (e.g., browser windows, wireless devices, etc.) that interact with corresponding concurrent application supervisory structures.

The SFDs in the SS of a //DC function can contain (and hence create) other //DC functions. Each of these //DC functions behave as described above (i.e., each one executes as a thread and creates and communicates with its own private window).

The regular DC functions in the SS of //DC function are for organizing the FBS part of the SS thorough abstract levels of functional decomposition.

FIG. 7 shows the grammar for YWAM's notational Web Programming Language (WPL) for specifying the operation of interactive server programs. The function expansion rules in the grammar ensure that the system representation preserves the semantics of the functions described above. (Note: a dashed-line box represents a supervisory computation function, whereas a solid-line box represents a worker computation function. Also, a box with two bottom lines is called an Internal Code Block (ICB) and used to embed textual code in an SFD—e.g., data declarations, assignment statements, object creation, etc.).

It is important to see that the totality of a program structure derived from the grammar of FIG. 7 is binary code that runs at the application server machine(s). During execution of this structure, the dialogue place-holder functions and the clientDC place-holder functions of this structure activate via websocket messages their actual function equivalents at the client machine. These place-holder functions send their input parameters to actual client functions and receive their output parameters from these client functions. Hence, although the tasks of these functions are actually performed at the client machine, the program structure running at the server does not know this and would care less. Hence, during development of the program structure at the application server, these place-holder functions can also be used as temporary stubs.

FIG. 8 contains an example supervisory structure that conforms with the rules of the graphical grammar of FIG. 7. In FIG. 8, functions "A" and "H" are //DC functions and the SS of each of these functions executes as a thread (hence the term "parallel DC"). For example, the supervisory structure of "A" consists of two supervisory cells and executes as a thread. This thread creates its own private browser window and the dialogue function of the SS (i.e, functions B,D,F) communicate with the documents displayed in this private window. Of course, these documents are provided by the HTTP server(s) used by the application.

As FIG. 8 shows, the SS thread for function "H" is created during execution of the SS of function "A". The dialogue functions of the thread for function "H" communicates with the user via the private window of this thread. The window of a //DC thread opens with a home document for the SS it executes. However, during execution, the dialogue functions of the thread can replace and/or modify this window's document as needed.

In FIG. 8, the creation of the thread for function "H" is also an example of activation of an asynchronous non-blocking concurrent function. Here, as its SFD shows, the function "C" first calls functions "E" and "F" in sequence, then creates the asynchronous concurrent thread for function "H", and continues with calling function "G".

Following is a list of example YWAM application structures in the order of increasing level of structural complexity:
- A single //DC function supervisory structure performing simple computations and displays.
- A program that starts executing as a //DC function structure and, as needed according to the logic flow of the program, creates other //DC function-threads. When a //DC function completes its task (e.g., terminated by the user), its thread and window and its connection to the window die. If it needs to be recreated, both the thread and its window and its socket connection are all recreated.
- A user interface that begins with multiple windows each with its own thread. (Example: An instrument control panel in which each window controls a different instrument).
- A distributed enterprise system with multiple user types (i.e., a system that identifies and authenticates the user and instantiates the //DC function designed for the identified user type).

Browser-Document Structure and Dialogue Data Flow

YWAM extends a conventional W3C browser document with a new part called the Application Message Processor (AMP). FIG. 9 shows the two parts of a YWAM browser document. The conventional W3C part 1, in addition to performing all its well known standard activities, handles the document-to-application data flow (i.e., the user inputs). The programmer implements this document-to-application-program data flow via Javascript functions that send this data via the document's websocket connection to the application-program. The AMP 2 on the other hand is only for handling the application-program-to-document data flow that modifies the display. The AMP has access to a plurality of built-in, programmed, or imported Javascript functions that it uses in implementing the display directives that it receives in websocket messages sent by the application-program. FIG. 9 includes a sample subset of these messages on arrows flowing from the application instance 3 to AMP 2.

The AMP is event driven and the events processed by the AMP are the websocket messages that come from an application thread or application dialogue functions. An AMP message consists of a message type followed by the [message body]. In FIG. 9, as the text on arrows that flow from the application-program instance 3 to the AMP 2 show, some message types are: "//DC", "doc", "window", "data", "code", and "close". The AMP processes these messages as described below.

A //DC message is sent to the browser from a newly created //DC thread (e.g., created by the application server or created by an existing application thread). The message is sent by the //DC root function of the new thread. A //DC root function, before sending this message, first creates a listening socket to accept a forthcoming websocket connection request from the browser, then it sends with a //DC message the identity of this listening socket (i.e., DCLS_uri) and the URI of its home dialogue document (i.e., DCdoc_uri). The message is sent to the browser window of the thread's creator. The receiving AMP processes a //DC message as follows: it opens the new thread's user-interface window with the new thread's home document identified in the //DC message (e.g., via Javascript code: Newwin=open(DCdoc_uri)), and connects this window to the new thread via the thread's listening socket identified in the //DC message (e.g., via Javascript code: Newwin.ws=new websocket ("ws: DCLS_uri");). After the websocket connection is set up, the //DC function thread starts executing the program SS. During this execution, using the websocket connection established above, the thread's dialogue functions communicate only with the documents in the thread's dialogue window.

All other application messages in the figure (e.g., doc, window, data, code, close) come to an AMP from the dialogue functions of the SS of a thread. Upon receiving a "doc" message, the AMP replaces the window document with the document whose URL is specified in the message (e.g., via Javascript code: location.replace(DCdoc_uri)). Upon receiving a "window" message, the AMP opens a new window with the document specified in the message. The "data" message brings the name of a Javascript function which will modify the DOM and the display using the data (if any) that comes as a part of the "data" message, and, the AMP simply calls this function by passing to it the received data. For the "code" message, the AMP executes the Javascript code that comes with the message. The "close" message simply directs the AMP to close the thread's window. It is important to state that the list of AMP messages is open-ended and is not bounded by the messages exemplified above. An example addition to the above list is a "ping" message—a //DC function can perodically send a "ping" message to check if its window is still there (e.g., not closed by the user).

As FIG. 9 shows, the user inputs are processed via the conventional W3C part of a document. However, the designer decides whether these user inputs are processed via conventional W3C techniques or they are sent over the window's websocket to the YWAPA application for processing. When the latter option is used, document objects that appear as web document hyperlinks are no longer HTML hyperlinks but are user inputs that a document uses itself or sends over the websocket to the application SS thread which can use this dialogue data in a way it is programmed to do so. A YWAM dialogue document sends its data via in-line Javascript code or via event-driven Javascript code (e.g., sending FORM data to an application thread through a websocket).

Application Instantiation Page (AIP)

As stated earlier in this description, a user accesses an application or a service by executing at the browser an Application Instantiation Page (AIP) which is also called a Server Access Page (SAP). The main purpose of an AIP is to connect a user to the application program/system and open this program's user interface. As mentioned earlier, the use of an AIP results in instantiation of an interactive application program instance (e.g., at the server machine) and this interactive program instance and the AIP together set up at the client machine the user's interface to said interactive program instance. In some cases, this interactive program instance may be the totality of the application served to the user by the application server (e.g., a text editor). In some other cases, this interactive program instance may be the user's interaction interface to an already up-and-running application system such as an enterprise network system, an airline reservation system, a banking system, social networking system, etc. Yet, in some other cases, this interactive program instance may serve as the application's front-end that authenticates the user and then instantiates an interactive program instance that matches the user type. These user-type-specific interactive programs can be instantiated by a central application server or there may be a separate application server for each user-type.

An application can also offer a plurality of separate services each with its own entry function that will be invoked as a thread or a process by the application server. Each such service may be accessed via executing its own AIP. Hence, an application can have a plurality of SAPs (i.e., AIPs) providing for service selection capability.

An AIP has the same YWAM dialogue document structure that FIG. 9 shows (i.e., it consists of a W3C part and an AMP part). An AIP that does not interact with the user is invisible.

An AIP may or may not interact with the user. If it does, such AIP interaction may include user authentication and identifying the user's role in the system (e.g., an administrator, an agent, a manager, etc.). While performing these activities, the AIP may communicate with the application server.

An AIP can open multiple parallel windows for an application, and, if needed, it can open multiple parallel applications.

An AIP can be accessed via a hyperlink in a document, it can be requested by an application in execution via a document request it sends to the browser, or for applications that do not want their AIPs accessible via above methods the AIP can be in a portable storage device as a ".html" file which can be opened and executed by the user.

Details of Creating and Executing a YWAM Application

Before an application can be instantiated, the YWAPA components shown in FIG. 1 and an AIP for connecting to the application server must be installed. FIG. 10 shows a procedure for doing this.

FIG. 11 shows a method for instantiating and executing an interactive web application program. As the figure shows, the participants of this process are: Browser 1, HTTP-server 2, AIP-on-browser 3, Application-Server 4, and Application-Instance-Thread 5. An application program instantiated by this method is developed using the grammar of FIG. 7.

FIG. 12 is a detailed pictorial version of FIG. 11 and shows a process of creating and executing an example application-program instance. Also included in FIG. 12 is an application supervisory structure represented as a triangle which executes in an application instance thread. A supervisory structure is typically derived using YWAM's notational grammar in FIG. 7, and, top-level function of this particular structure in this example is a //DC function (i.e., derived via the second rule of the grammar). During execution, this structure communicates with the two parts of a dialogue document (discussed earlier) also shown in the figure. FIG. 12 also contains an example AIP. (Obviously setting up a websocket connection requires compliance with the websocket protocol handshaking, etc. For simplicity, the figure does not show these activities which can be implemented via manual programming or automatic code generation.)

The numbered arrows of FIG. 12 show the sequence of events that takes place during the application-program instantiation process that precedes the application program's execution (i.e., execution of Application SS in FIG. 12). The strings typed in italics represent sample program code or data that can be utilized during these events and are included for programming-oriented reader. These events are:

1. The application user clicks on an application hyperlink that links to the application's AIP stored at an HTTP server. (Of course, the AIP is previously developed and stored at the HTTP server. This server may also store other previously developed application dialogue documents).
2. The browser receives the AIP and starts executing it.
3. The AIP sends a connection request to the application server (not to the HTTP server) via creating a websocket object. This connection request is sent to the listening socket of the application server (i.e., identified as serverLS_uri), the IP address and the port# of which may be built into the AIP. The application server accepts the connection, and handshakes with the browser. At this point, the AIP becomes the application server's browser page, and the AMP of AIP is at "waiting for websocket message" state.
4. The application server creates an application instance as a child thread and passes to it his websocket connection his browser page (i.e., to AIP).
5. The newly created child //DC thread creates a Listening Socket (DCLS), constructs the "IPaddress:port#" URI string for this listening socket, and sends to his parent's browser page a //DC message that contains this URI string for the listening socket (e.g., called DCLS_uri) and the URI of the opening document for the thread (e.g., called DCdoc_uri).
6. The browser page of the parent receives the child thread's //DC message, and opens a new dialogue window for this //DC child thread (e.g., via Javascript code: Newwin=open('DCdoc_uri')).
7. The same browser page of step 6 above starts the websocket connection protocol for this new window (e.g., via Javascript code: Newwin.ws=new websocket('ws: DCLS_uri')). The child thread accepts the connection request and handshakes with the browser. After the handshake, the thread executes its application code (e.g., the supervisory structure shown as a triangle in FIG. 12))
8. During the execution of the SS, all thread dialogue functions use the thread's websocket connection (e.g., identified as "threadsocket" in FIG. 12) to the thread's window, and any application document loaded into this window uses the same websocket connection to communicate with the application thread that owns this window.
9. If and when the execution of the SS in the thread encounters a //DC function, just like the application server did in step 4 above, it creates a //DC thread for the underlying SS and passes to it the connection to the current browser page/window. Then, steps 5,6, and 7, and 8 above apply to the new thread. FIG. 13 shows this process of creating a //DC thread and its user-interface window.

FIG. 12 also shows that a dialogue HTML document may also contain parts that talk to conventional WWW servers while utilizing various W3C technologies (e.g., AJAX). Hence, as mentioned before, a web application designer using YWAM can also utilize conventional W3C technologies as a part of his/her design.

The above protocol for creating and executing an application instance is based on the paradigm that a websocket is a property of the window object and can be accessed as a window property by all documents loaded into the window. However, some browsers may implement a websocket not as a window property but as a document property. In this case, each dialogue HTML document has to setup its own websocket connection with the application. FIG. 14 shows a procedure for doing this. In FIG. 14, a //DC message sent to a browser document, in addition to containing the DCLS_uri and DCdoc_uri as before, also contains the identifier of the //DC function (denoted as DCid) that uniquely identifies the thread. The receiving AMP now stores DCLS_uri in a sessionStorage associative array (named sessionStorage.D-CLS_uris) accessible by DCid, and opens the new thread window with DCdoc_uri. Then, the AMP of every document loaded in this window first retrieves from sessionStorage the DCLS_uri for the thread, and uses it to connect to the thread via a new websocket. Of course, each time it sends a new-document message to the browser, the sending thread should listen on its DCLS for a forthcoming websocket connection request.

An alternative approach to "websocket for each document" approach of the above paragraph stores the websocket of a thread-window in sessionStorage when the window is first created. Then, using the DCid as the access key, the thread's documents can retrieve it and use it. This sessionStorage approach, unlike the "websocket for each document" approach of the previous paragraph, does not require websocket creation for every document of a thread.

Instead of directly connecting to browser documents, each application instance may communicate with the browser through a Websocket Relay Station (WRS) object. The browser views the WRS as the application, and the application views the WRS as the browser. The WRS relays the data flow between the browser and the application. The browser connects to a WRS via a websocket and an application instance thread connects to a WRS via a conventional TCP socket. The advantage of using a WRS is that the WRS encapsulates the websocket creation and management process and hence simplifies the application code.

Accessing an Application within an Application with Parameter Passing

A user of an application-A document can invoke a separate application-B via an hyperlink in an application-A document that retrieves and executes an AIP of application-B. When this is done, the retrieved dialogue pages of application-B become part of the same browser session serving application-A. Hence, before invoking application B, if application-A writes into session store the data it wants to pass, then after it is instantiated, application-B browser dialogue pages can read this data from the browser's session store. Of course, the designer of application-A can do this if he knows what the parameter passing protocol is. One viable method is using a string that lists parameters in [name,value] pairs. Hence, the designer of application-B would then publish a list of services with a Service Access Page (SAP) for each service and a list of parameter-names for each service.

An example use of this parameter communication follows: an e-mail that a vendor sends to a customer displays the tracking number of a shipment as a hyperlink so that the customer can examine the shipping status. The e-mail user's click action on this hyperlink stores this tracking number in the browser's session store and executes an AIP for the tracking web service of the shipping company. The service instance of the shipping company so instantiated reads the tracking number from session store and displays for the user a shipment status page for that tracking number.

It must be noted that although the discussion above addressed data flow from one application to another, the data flow can be bidirectional (e.g., application-B above can pass back data to application-A using the same session store). FIG.

15 shows how an application (i.e., labeled as 1) invokes another application (i.e., labeled as 2) with parameter communication.

User Friendly Responsiveness

User friendly responsiveness is achieved by serving user requests in parallel without blocking. Obviously, because each //DC function by definition serves a separate parallel window, each of these windows interact with the user in parallel.

For further parallelism of intra-window user interactions, the supervisory cell for the //DC function of a window may be designed to selectively process intra-window user inputs synchronously and/or asynchronously. In a program driven by user-input events, being able to choose between synchronous and asynchronous processing of user-inputs is important. This is because user-friendly program behavior might require synchronous sequencing of some functions, and asynchronous processing of some user inputs may not always be the best choice. For example, finalizing a hotel reservation prior to finalizing an airline flight reservation might not make much sense. Likewise, some mission specific systems might require strict sequencing of some system functions. The graphical programming language of YWAM contains notation that identify synchronous and asynchronous functions as well as the notation that identifies precedence relationships to be realized while executing concurrent functions. Using this notation, one can specify an event-driven //DC function behavior that properly sequences the user-input events. Also, using this notation, the language compiler (a human or a program) or the interpreter generates the appropriate "spawn", "fork", and "wait" instructions.

Another tool for in-document parallelism is the use of Parallel Interactive Document Objects (PIDO) introduced by this invention. A PIDO is a collection of HTML elements in a dialogue document which interacts with its own application-server thread. A document can contain plurality of PIDO's each of which can interact with the user in parallel. A PIDO definition in a document can be identified in one of many ways including: (a) each element of a PIDO contains the PIDO_identifier attribute; (b) the elements of a PIDO are placed between "begin PIDO_identifier" and "end PIDO_identifier" statements; and (c) an iframe constitutes a PIDO.

FIG. 16 shows an example graphical application-server code for a function named "A" serving a document with three PIDO's symbolically named as "C", "D", and "E" whereas each PIDO interacts with a thread that has the same identifier as its own. In this example, the code for function "A" is simply a non-blocking loop which gets a user input in a websocket message and passes it to the thread of PIDO identified in the message. As the FIG. 16 notation shows, each PIDO thread is a concurrent DC function. Each such function interacts with the user via manipulating its PIDO definition via dialogue documents.

FIG. 17 shows a method for implementing a PIDO in an interactive web application program.

Scalability for Serving a Large User Population

When the user population is larger than what a single server can handle, YWAM uses multiple application servers. Typically, one of these servers is a supervisory server that keeps track of the number of users served by each of the other worker servers. An AIP initially connects to the supervisory server, and the supervisory server either serves the user itself or tells AIP to connect to another server that it chooses—e.g., by sending to the AMP of the AIP a CONNECT message that carries the URL of the application server that it chooses. The AIP then connects to this server (i.e., as in FIG. 12) and the user is served by the interactive program instance created by this server. Obviously, the worker servers inform the supervisory server when their users exit such that the supervisory server can keep track of the user population on each of these servers The above paragraph defines a server structure consisting of a supervisory server administering a set of worker servers. However, just like a supervisory function can call a lower level supervisory function, a supervisory server can redirect the connection process described above to another supervisory server in its domain. Then this latter server performs the activity described in the above paragraph, and may also repeat the activity described in this paragraph. Hence there may be a network of hierarchically organized supervisory servers.

The scalability of YWAM applications can be elevated via currently available state-of-the-art techniques such as elimination of busy waiting and asynchronous programming of functions. The graphical programming language of YWAM contains notation that identifies the functions that execute in these modes.

Function Allocation Between the Client and the Server

If a DC structure can be executed on the client machine (e.g., all its computations can be done by the client machine), the designer may decide to do this for this would reduce the load on the application server. The program notation identifies such DC functions and such a DC function structure can be automatically or manually translated into javascript code and included in scripts accessible by the AMP. When this is done for a DC function, that DC function still preserves its place in the application program structure at the application server but only as a placeholder function to invoke the actual worker javascript function at the client machine. When called at the application server, a placeholder DC function would send to the AMP a message that identifies the DC function script to execute. The same placeholder DC function may also receive the execution results (if any) through its websocket connection.

YWAM and MVC

It should be obvious by now that an interactive supervisory structure of a //DC function directly maps into MVC components of the Object Oriented paradigm. This mapping is as: the FBS is the MVC controller, the set of computational functions called by the FBS is the model, and the set of dialogue functions called by the FBS is the MVC view. For example, for the //DC function A of FIG. 8, the controller or the FBS consists of the functions A and C, the MVC model consists of functions E and G, and the MVC view includes the functions B, D, and F.

FIG. 18 shows how to use YWAM's grammar in FIG. 7 to create an object oriented application system. In reality, by providing for a tree structure of //DC function supervisory structures, the YWAM's notational grammar also organizes a tree-structured MVC hierarchy (or tree-structured MVC hierarchies that execute in parallel). The SS of FIG. 8 is an example of two MVC structures whereas one creates the other one dynamically during execution time (i.e., the MVC structure headed by function A creates the MVC structure headed by function H).

Publishing/Registering an Application

A YWAM application is published by publishing the URL of its AIP. This is accomplished by registering the [application_id, AIP_URL] pair at a proprietary application directory site named as YwebAIP.com. This directory can be used in a plurality of ways including:

(a) A document designer can manually examine the directory and extract the AIP URL that he/she wants to use as a hyperlink in his/her document;

(b) Within a document, the URL string "YwebAIP.com/application_id" can retrieve from YwebAIP.com a short HTML document that contains a javascript statement that retrieves and executes the AIP (e.g., window.location.assign ("AIP_URL")); or (c) A document sends to YwebAIP.com the application_id and YwebAIP.com retrieves the associated AIP and returns it to the browser.

The advantage of using options "b" or "c" above over option "a" is that the URL of the AIP is transparent to the user/document designer. Hence, the owner of an AIP can relocate the AIP with no need to inform the users of the AIP.

An alternative publishing/registering approach is to place all application AIP's in an HTTP server (e.g., called AIPserver.com) as HTML files and name these files with the associated application identifiers. Then one can retrieve an AIP simply by the URL string: "AIPserver.com/application_id". With this approach, publishing or registering an application is simply uploading the application's AIP to the AIP server.

Yet another method for registering an application is by using a top level IANA domain as the AIP_URL directory. If this domain is called ".app" for example, the in-document address of an application would be "application_name.app" and it would return the URL of the application's AIP. However, this method requires modifications to web browsers for first retrieving the URL of the AIP and then retrieving and executing the AIP.

Another method of accessing an application is by Using a portable external storage device that stores the AIP of an application server as a .html file. Then, one can simply execute this .html file on any client machine and starts using an instance of the application.

FIGS. 24.*a*, 24.*b*, and 24.*c* illustrate various AIP publication and access methods discussed above. In FIG. 24.*a*, application developer 1 uploads into HTTP Server 5 the application's AIP or uploads a Javascript file that will retrieve the AIP, and registers [Application_id, AIP_URL] values into an Application Directory Service. (For example, if the USPTO web site was to be re-developed by using YWAM, the directory entry for this site could be: [uspto, www.uspto.gov]). A document developer 2 interactively identifies the URL of an AIP and uses it in browser document 3 as an application access hyperlink. A document user 4 clicks on an application hyperlink and the browser retrieves from HTTP Server 5 the AIP or retrieves a Javascript file that will retrieve the AIP. Likewise, In FIG. 24.*b*, application developer 1 registers [Application_id, AIP_URL] values in new IANA domain ".app" 2. When user 4 clicks on an application hyperlink (e.g., www.application_id.app), browser 3 first retrieves from domain 2 an AIP_URL, then sends to HTTP Server 5 an AIP_path_string to retrieve from HTTP server 5 the AIP uploaded by developer 1. In FIG. 24.*c*, application developer 1 stores an AIP as a ".htm" file in a non-transitory machine readable medium 2, and user 4 simply connects this device to a client machine 3 and executes AIP.htm on his/her choice of a web browser.

YWAM's Dual SS Architecture

So far, this description covered a YWAM application architecture in which an application instance runs at the application server, and the dialogue HTML pages run at the client machine. We shall refer to this architecture as mono-SS architecture. As an alternative, FIG. 19 shows the dual-SS architecture in which both the client and the server identically execute the same Behavioral Structure (BS) part of an SS. The BS at the client machine calls the actual dialogue functions (denoted by the capital letter D in the figure) for user interaction, and the BS at the server machine calls the actual computation functions (denoted as C in the figure) for server side computation. But each dialogue and computation function, before it returns to its calling BS, sends its output data to its same-identity placeholder function (i.e., 'd' for dialogue or 'c' for computation) called by the BS in the other machine. A placeholder function has the same name and parameters as its actual function equivalent that executes at the other side. All a placeholder function does is to receive the output data of its actual-function equivalent and return it to its caller. Hence each BS receives the identical dialogue and computation results and exhibit identical behavior, and neither one knows whether it is running on the client or on the server machine. FIG. 20 shows the steps of a generalized method for implementing a program with dual-SS architecture on two processors host-A and host-B.

When a program's notation identifies the functions specific to each host (e.g., the dialogue functions at a client machine and the computation functions at a server machine), creation of the dual program structures discussed above are transparent to the application developer. The developer specifies a single SS with no regard to what machine it will be running on. The YWAM compiler receives the application SS representation as an input and generates the executable dual structures and associated embedded protocol code as its output. The compiler can be a computer program or can be a software engineer who does manual compilation.

The dual SS architecture eliminates the need for remote procedure calls. Also, the concept can be applied to more than two machines such that each machine executes the same common program structure whereas each machine specific actual function sends its output data to placeholder functions in other machines. Likewise, all machines exhibit the identical behavior.

FIG. 21 shows one practical implementation of the dual SS architecture. Here, the server SS 1 is compiled binary-code instantiated as a thread by the application server and the client SS 2 is the Javascript equivalent of that server SS which is retrieved from the HTTP server. As FIG. 21 shows, the client SS establishes websocket connections both to the browser and to the server SS. Both the server SS and the client SS execute the same Behavioral Structure and use the websocket 3 for data exchange between the actual and placeholder dialogue and computational functions. The actual dialogue functions are executed in the client SS 2 and these functions talk to the HTTP dialogue pages 4 as discussed before, through a websocket connection 5. FIG. 22 shows a method for developing a program with the dual-SS program architecture of FIG. 21.

The implementation of the operation in FIG. 21 requires that Javascript has listening socket functionality for facilitating establishment of the previously discussed websocket connection between a browser window/document and the client SS written in Javascript. In the absence of this Javascript listening socket functionality, the socket connection and communication between the browser dialogue documents and the client SS Javascript document can be facilitated through the browser's sessionStorage.

FIG. 23 shows a method for instantiating and executing a YWAM application with dual-SS architecture as in FIG. 21. In FIG. 23, the label of each box indicates an actor and a box contains the actions of its actor. For example, the actor of box 1 is the AIP and the action is to connect to the application server. The solid arrows in the figure show the sequence in which the actors perform their actions. The actor of box 2 is the application server, the actor of box 3 is the application instance, the actor of box 4 is the AIP of box 1, and so on. The dashed arrows in the figure are labeled with data flowing among the action boxes.

Wider Scope of the Invention Obvious to Persons of Ordinary Skill in the Art

Persons of ordinary skill in the art should conclude that following approaches stay within the scope of the invention presented in this description.

Without departing from the scope of the invention, while keeping the role of the application server of YWAM as it is, one can replace the web browser with a more effective dialogue engine, one can replace the HTML with a more expressive and more powerful dialogue specification language, and one can replace the HTTP server with a dialogue document server that can serve not only textual documents but also executable binary dialogue code.

Furthermore, as stated earlier in this description, the AMP messages presented here are exemplary only and can be extended to include further functionality. One such example functionality is storing (e.g., at an HTTP server) and retrieving the intermediate dialogue pages.

Again, for simplicity, this description excluded HTML code from the application server. But when practical, a dialogue function can generate HTML code and send it to a document's AMP for inserting into a document. This can be done by an AMP message that specifies the message type as "HTML" and carries the HTML code and its place in DOM. Hence, this is another example of expandability of the AMP messages.

Although for simplicity of presentation, this description used a separate user interface connection (e.g., a separate websocket) for each application thread, the same communication capabilities can be achieved by multiplexing a plurality of communication channels on a single websocket connection. A message dispatcher that sits between the parallel application components and their user interfaces can manage this multiplexing. Obviously, replacing websockets with regular TCP sockets when it is viable (e.g., in self-contained secure private networks) is another connection setup strategy.

This description used graphical notation in identifying various program function types. It should be obvious that the same notational semantics can be represented by using textual means (e.g., appending function type to a function's name, using a type specific color in a function's name, etc.).

Obviously, software programs that will automate the use of YWAM are within the scope of this invention. For example, a graphical Web Programming Language compiler can generate the application code associated with the notation used. An example for this is the automatic generation of //DC thread code that interacts with the browser for setting up the user interface and connecting to it. It should also be obvious to persons skilled in the art that an interactive application program running at the application server includes run-time support software for providing robust system behavior. This includes periodic "ping" messages sent by the //DC function threads to check if their user interfaces (e.g., windows) are still alive (i.e., not closed by the user). If a thread's interface is closed by the user, the thread terminates itself.

It should also be obvious to those with ordinary skill in the art that the YWAM concepts presented via the functional decomposition embodiment of this description readily applies to programs developed with the object oriented paradigm. For example, when OO approach to system development is used, the notational grammar rules of the methodology shown in FIG. 7 may produce the following classes:

a) a supervisory-structure class for each concurrently-running system-level supervisory structure;
b) a Functional-Behavioral-Structure class for each concurrent interactive supervisory structure;
c) plurality of dialogue function classes—possibly one or more such classes for each Functional Behavioral Structure;
d) plurality of computation function classes—possibly one or more such classes for each Functional Behavioral Structure; and
e) YWAM protocol classes for embedding into an application the protocol activities such as interactive-thread-object instantiation and setting up the user-interface.

In the claims of this invention, a display-window is used as a preferred embodiment for the user interface, but it should be obvious to a person skilled in the art that a user interface can contain plurality of devices and plurality of interaction objects.

REFERENCES

[1] Yunten, Tamer., "A SUPERvisory Methodology And Notation (SUPERMAN) for Human-Computer System Development", in Advances in Human-Computer Interaction, Volume 1 (Google eBook)—editor: H. Rex Hanson; pp 243-278.

[2] Yunten, Tamer., "A SUPERvisory Methodology And Notation (SUPERMAN) for Human-Computer System Development", Ph.D. Dissertation, Virginia Tech Computer Science Dept., 1985.

The invention claimed is:

1. A method of implementing Yunten's Dual-Server Web Application Program Architecture (YWAPA) implemented on a set of hardware processors as a means for building target interactive web application systems, wherein the method comprising implementing parts a, b, and c of said YWAPA:

(a) a target interactive application program which runs on a network machine wherein said target program is a Document-Free Interactive Web Application Program (DFWAP) which does not internally store, access, generate, process or serve browser-executed dialogue documents such as Hypertext Markup Language (HTML) documents and communicates with a user through execution of, by a web browser or by a generic user interface engine at a client machine, external dialogue documents pre-stored at a document-only HTTP server;

wherein, to simplify application-program development process and to overcome shortcomings of HTTP protocol, a DFWAP substitutes for "implicit application behavior structure hidden in and behind cryptic browser pages and page hyperlinks" of HTTP request-response based prior-art application program development practice, an "explicit DFWAP Functional Behavior Structure (FBS) with links to dialogue pages which contain no hyperlinks back into said application program structure" whereby hiding internals of web pages behind said front-end functional behavior and truly separating web-page content from specification of application program behavior;

wherein recursive application of grammar rules of YWAM's notational Web Programming Language (WPL) is a means for developing said FBS whereas a DFWAP comprises said program behavior structure further developed to implement functionality specified in said structure;

wherein a DFWAP directly controls the execution sequence of dialogue documents at a browser by reversing document-to-program hyperlink convention of prior art as program-to-document links embedded in its execution paths and by commanding the browser to retrieve and execute the dialogue documents it encounters in its execution paths hence provides for enforcing human-engineered and/or mission-specific document sequencing;

whereas a browser retrieves said documents from said HTTP server which does nothing else for a DFWAP but serves no other than HTML-code and JAVASCRIPT containing documents and supporting static resource files whereas this server is a DFWAP's only source for unprocessed interactive dialogue documents, wherein:

(i) for application-to-user data flow, a DFWAP modifies all dialogue documents not at a server-machine at server-machine's expense but at a client machine via document modification requests it sends through its websocket connections;

(ii) for user-to-application data flow, the method provides for transmitting to a DFWAP any browser-recognizable user action, event, data, or object generated at a client machine;

(iii) wherein the method extends granularity of browser-program interaction beyond method/page invocations to program-statement/page-element level of interactivity;

wherein the method employs per-window websocket connections whereas all documents loaded into a window are automatically bound to the window's websocket connection whereby each document need not explicitly set up its own connection;

wherein, a websocket connection process is initiated by a DFWAP's connection request to a browser document but not by a browser document, and said request identifies to a browser a dynamically-generated URI for a server endpoint as a target endpoint for websocket protocol, whereby the method relieves a programmer from managing connection endpoint URI path strings in application source code and in browser-document JAVASCRIPT code;

wherein //DC functions in a DFWAP facilitate document-level web-application-program concurrency, and, plurality of Parallel Interactive Document Objects (PIDO's) further facilitate intra-document concurrency;

wherein a dialogue document of a DFWAP communicates only with its user and with its DFWAP and communicates with the rest of the WEB through its DFWAP, and a DFWAP can also be called by prior-art technologies as a means for enforcing dialogue document sequencing;

wherein the only HTTP request a DFWAP accepts from a web browser running at a client machine is an "upgrade" to websocket connection request and it accepts this message only to be able to connect to a HTTP-based browser; whereas a user interface engine which uses a protocol different than HTTP substitutes for said "upgrade" request a connection request consistent with the protocol it uses;

and furthermore, because a DFWAP eliminates document-to-program link convention of HTTP based prior art, no executable application program object in a DFWAP can be accessed and put into execution via a browser document hyperlink;

(b) an application program server for instantiating said target DFWAP which also is a DFWAP operative on said network machine wherein, once instantiated, a target DWAP interacts with its user on its own but not through said server;

wherein said server continuously listens on a preselected non-standardized TCP listening port for client connection requests and interprets each connection request as a request for connecting to a new instance of a DFWAP;

wherein said client is a generic user interface engine which in this embodiment is a web browser;

wherein the only HTTP request the server accepts is an "upgrade" to websocket connection request which the server interprets as above; whereas a user interface engine which does not use HTTP protocol substitutes for said "upgrade" request a simple TCP connection request;

wherein the server receives said "upgrade" request from a standards-based platform-independent stand-alone Application Instantiation Page (AIP) which the browser retrieves from said HTTP server upon a user's request or upon encountering a hyperlink to said AIP;

wherein, contrary to what the keyword "upgrade" of said incoming HTTP request implies, no HTTP communication between this server and the requestor exists prior to said upgrade request;

wherein upon receiving said "upgrade" request the server first executes a step of establishing a websocket connection to said AIP, next the server minimally further executes a step of instantiating and executing the target DFWAP as a process or a thread connected to the endpoint of the connection to said AIP; and (c) a set of dialogue documents served by said HTTP server including an HTML-standards-based platform-independent stand-alone ".html" DFWAP instantiation page called Application Instantiation Page (AIP) that provides for a browser-user's hyperlink access to user interface of said otherwise hyperlink-inaccessible target DFWAP of item "a" above, said AIP containing Application Message Processor (AMP) functionality, wherein when retrieved at a client machine by a browser via its hyperlink and executed, first the AIP establishes a persistent TCP socket connection to a pre-established non-standardized listening port of said server of item "b" above which in response executes a step of instantiating and executing the target DFWAP of item "a" above as a process or a thread connected to the endpoint of said TCP connection to said AIP, and next, said target DFWAP constructs its client-machine user interface and its websocket connection to this interface via a //DC function call that activates DSWAP protocol which, by using said connection to said AIP, interacts with AMP of said AIP in setting up said interface and websocket connection to said interface;

whereas above disclosed method is also a means for transforming an existing pre-web interactive application program into a web-browser-accessible interactive web application program, and, DFWAP functions developed by above disclosed method for controlling browser-document sequencing can also be embedded in execution paths of HTTP request-response based servers that upgrade to websocket communications.

2. The method according to claim 1, wherein the method extends itself to allow intermixed use of DFWAP technology of claim 1 and prior-art non-DFWAP technologies and provides for embedding program controlled document sequencing capability of the former into user-chosen-hyperlink-driven HTTP request-response based operation of the latter and vice versa, the method comprising use of a dialogue document format comprising parts A and B below:

A. a conventional W3C part that handles user-to-application data flow wherein a programmer can choose user-input's destination as an application-program instance created by an application server of YWAPA via sending user-input through a websocket or the programmer can choose user-input's destination as a conventional HTTP server; and B. an Application Message Processor part abbreviated as AMP that processes application-to-document websocket messages for modifying the browser's display viewed by a user as well as processing run-time support messages sent by a binary application, whereby message-types and associated AMP actions comprise:

i. if message type is "Interface Request" or "//DC", open a new user interface such as a window with interface information specified in a message and create said interface's websocket connection to the application thread or process sending the message;

i. If message type is "window", create a new window with window specifications and document URL carried in the message and assign current websocket connection to the new window;

ii. if message type is "document", load the browser document identified in the message;

iii. if message type is "data", modify the DOM (hence modify display) via the JAVASCRIPT function identified in the message by using the data carried by the message;

iv. if message type is "code", execute the JAVASCRIPT code carried by the message;

v. if message type is "read session store", send via websocket the session store data specified in the message;

vi. if message type is "write session store", write into session store the data specified in the message;

vii. if message type is "ping", send back a "ping acknowledgment" message;

viii. if message type is "connect", start a websocket connection protocol to connect to the application server whose URI is carried in this message;

ix. if message type is "close", close this window; and x. an open-ended set of other message types and actions that would be apparent to those skilled in the art.

3. The method of claim 1, wherein characteristics of an AIP further comprising:

(a) an AIP can instantiate plurality of application server threads and iteratively process "Interface Request" messages from plurality of application threads to construct a composite user interface consisting of plurality of individual thread interfaces whereas the AIP connects each individual thread interface to the application thread who has sent the associated "Interface Request" message, a browser window being an example of an individual thread user-interface;

(b) by executing a sequence of connection requests, an AIP can connect to a client machine plurality of DFWAP's executing in parallel;

(c) an application can have multiple AIP's such that by choosing an AIP a client can access a particular service among plurality of services provided by an application;

(d) an AIP may reside at an HTTP server and it may be retrieved via a web-browser document or the AIP can be a private ".html" file manually loaded into the client machine from a portable non-transitory machine readable medium and executed at the client machine;

(e) URL value(s) of the application server(s) that an AIP connects to are built into the AIP; and (f) an AIP provides for location independence and mobility for an application server by hiding the URL of the server from a user of the AIP.

4. The method according to claim 1, wherein the method further comprises a new software function type called //DC representing interactive operation of a new abstract distributed execution-time object comprising a new application program thread connected to a new browser window via a new TCP connection which in this embodiment is a new websocket connection, wherein the application code for a //DC function is encapsulated in the thread of said object whereas source-code name of a //DC function identifies the execution-time purpose of said object whereas this claim refers to said object also as "//DC object";

wherein a DFWAP's source-code notation identifies a //DC function and identifies the application program code of said function;

wherein a call in source code to a //DC function is not a traditional function call but is a place-holder for YWAM's Dual Server Web Application Protocol (DSWAP); and wherein said DSWAP protocol dynamically creates at run time said function's //DC object and starts execution of the function's application program code encapsulated in said thread of said //DC object whereas the dialogue functions of said thread interact with the documents of the window of said object.

5. The method according to claim 4 further comprising steps-of-DSWAP-protocol comprising the steps:

(a) an application program call for a //DC function first creates an instance of application-program code of the function, next binds this instance to the end-point of the current websocket connection which serves as an initial temporary connection, next creates a thread for said function instance, and next starts execution of said thread;

(b) said //DC function thread first creates an ephemeral listening socket, and, using said initial temporary websocket connection, sends to the browser a //DC message containing: {the URI for said listening socket, a URI for the thread's opening dialogue document, and a set of attributes for the thread's dialogue window}, and next, to connect to said dialogue window, listens on said listening socket for the browser's forthcoming websocket connection request;

(c) the browser page that receives said //DC message first opens said thread's dialogue window with the thread's said opening dialogue document, and next connects this new window to said function's thread via an "upgrade" to websocket connection request destined to the thread's listening socket, whereas an "upgrade" request is the only HTTP request a DFWAP accepts from a browser, whereas a user interface engine which does not use HTTP protocol substitutes for said "upgrade" request a simple TCP connection request; and (d) said //DC function thread of step "b" accepts said websocket connection request, handshakes with the browser, and continues with executing application code of said function;

wherein a programming language that supports //DC functionality hides from a programmer said DSWAP protocol and automatically generates the code for said protocol, otherwise a programmer manually codes said protocol.

6. The method according to claim 5, wherein to give each dialogue document of a //DC object the ability to individually connect to said //DC function, said DSWAP protocol is modified as: (i) in step "b", a //DC message includes an additional parameter called "//DC thread identifier" identifying a thread sending the message, and (ii) in step "c", a browser page receiving a //DC message enters said //DC thread identifier and URI of its associated listening socket in an associative array containing [//DC thread identifier, listening socket URI] entries the search key for which is //DC thread identifier; and further, aside from said modifications, each new document request that a //DC thread sends to a browser window, in addition to a document URI, carries the thread's said //DC thread identifier which the receiving window saves as a well-known window property, and after sending a document request a thread listens on thread's listening socket for a forthcoming "upgrade" to websocket connection request, and, every new dialogue document retrieved by a browser first executes a step of retrieving the thread's listening-socket URI from said associative array via said //DC thread identifier, and next connects to said //DC function thread by sending to said listening socket an "upgrade" to websocket connection request and completes the connection by handshaking with the thread.

7. The method according to claim 4, wherein implementation of a //DC function with a user-interface dialogue document containing a Parallel Interactive Document Object (PIDO) comprises steps:
  (a) include in the dialogue document a PIDO definition comprising a set of HTML elements and encapsulate this set of HTML elements between "begin PIDO_identifier" and "end PIDO_identifier" statements and/or include in each element of the set a PIDO_identifier attribute;
  (b) Include in the dialogue document code for sending PIDO's websocket messages to the PIDO's //DC-function server thread;
  (c) program the //DC-function server thread with a message-dispatching loop to:
    (i) read a websocket PIDO message sent by a browser document and, if not already created, create the PIDO's thread; and
    (ii) pass the message to the target PIDO thread via classical producer-consumer synchronization between this message dispatching //DC thread (i.e., the producer) and the PIDO's server application-program thread (i.e., the consumer);
  (d) Within the PIDO's server thread, write code to process incoming messages and send display-manipulating output websocket messages to the PIDO's dialogue document.

8. The method of claim 1, the method further comprising the installation choices:
  (a) Install the application program on a local/personal computer;
  (b) Install on the local/personal computer an application server to instantiate the application program;
  (c) Install dialogue documents of the application program on an HTTP server on the local/personal computer; and
  (d) Install an AIP for the application program on the local/personal computer.

9. A computer system for providing automated support to method of claim 1, said system comprising a hardware processor, a display terminal, a RAM, and, a non-transitory storage medium containing: (i) a Graphical Web Programming Language (WPL) editor for interactively developing a graphical representation of DFWAP source code and for storing said representation on said non-transitory storage medium, and (ii) a WPL compiler for reading said source code from said non-transitory storage medium and translating said source code into executable binary DFWAP code which includes automatically generated code for DSWAP protocol, and optionally, further translating said source code into browser-executable JAVASCRIPT code for stand-alone use or for use with dual-SS architecture, wherein said WPL editor generates said source code for a DFWAP system according to recursive application of following system programming-language grammar rules:

SYSTEM→STRUCTURE|concurrent STRUCTUREs;
STRUCTURE→//DC|DC|supervisorC;
//DC→SFD of any combination of (//DC, DC, clientDC, supervisorC, workerC, D, ICB)
  except SFD of any combination of only (supervisorC, workerC, ICB) or SFD of only (D);
  +server thread for this function
  +client-machine user interface for this function
  +socket connection between said server thread and said client-machine user interface;
DC→SFD of any combination of (//DC, DC, clientDC, supervisorC, workerC, D, ICB) except SFD of only (supervisorC, workerC) or SFD of only (D);
supervisorC→SFD of any combination of (supervisorC, workerC, ICB)
  except an SFD of only ICB;
clientDC→server-side placeholder function for client-side DC function;
D→server-side placeholder function for client-side dialogue function;

whereby the terms used in above grammar are defined as:
"SYSTEM" is interactive web application software system all or a part of which is instantiated by an application server upon a browser's websocket connection request whereas said application instance communicates with a user through hypertext markup language (HTML) code and JAVASCRIPT code containing dialogue documents which are stored at one or more HTTP servers and which are retrieved and executed by said web browser, whereas a web application system may include plurality of software processes and/or threads concurrently running on a plurality of application server machines some of which may already be in execution before the user's connection request;
"STRUCTURE" stands for an application server process or a thread running on an application server machine, and concurrent STRUCTUREs may run on the same machine or on plurality of machines;
"DC" stands for a high level interactive function called Dialogue-Computation function composed of dialogue and computation functions;
"//DC" stands for a DC function concurrently running as a server thread or a process which owns an asynchronous private window as its user interface;
"clientDC" stands for a place-holder application-server DC function that invokes a client-side same-identity function via a websocket message carrying the client-side same-identity function's input parameters (if any), and, after the client-side function completes its execution, this server-side clientDC function described here receives the output parameters (if any) from the client-side same-identity function via a websocket message and returns to its caller;
"supervisorC" stands for a high level server computation function which can only call computation functions and has no user dialogue in its underlying structure;
"workerC" stands for a terminal computation function at the application server which does not call other functions an does some computational work;
"ICB" stands for a textual internal code block within an SFD (described below) whereas this code can be anything such as data declarations, object creations, arithmetic operations, data communications, event-driven logic, etc.

"D" stands for an application-server dialogue function whose activities include:

i) invoking a client-side AMP function via a websocket message which carries the function's input parameters;

ii) receiving from a client machine websocket messages carrying user inputs;

iii) translating application data outgoing to a browser into text and translating incoming browser textual data into application data types; and "SFD" stands for graphical and/or textual representation of a function's execution-platform dependent operation, including representation of execution flow (sequence, decision, iteration, recursion, creation and synchronization of concurrent functions, event-driven behavior, blocking and non-blocking operations), and data flow.

10. A method according to claim 8, wherein two copies of a web application program are produced as in claim 7 to simultaneously run both at a client machine and an application-server machine thereby eliminating the need for remote procedure calls via operational characteristics comprising:

(a) at the client machine, a JAVASCRIPT version of said program's Functional Behavior Structure manages the sequencing and communication between dialogue and computational functions, and at the application-server machine, the compiled binary version of same Functional Behavior Structure manages the sequencing and communication between dialogue and computational functions;

(b) the Functional Behavior Structure that runs at the client machine calls the actual dialogue functions that interact with a user through dialogue documents, and a Functional Behavior Structure that runs at the application server machine calls for each actual client-machine dialogue function a corresponding placeholder dialogue function that has the same name and parameters as the actual dialogue function but whose only purpose is to receive user inputs from the actual dialogue function of the client machine;

(c) the Functional Behavior Structure that runs at the application-server machine calls the actual computational functions and the Functional Behavior Structure that runs at the client machine calls for each actual application-server-machine computational function a corresponding placeholder computational function that has the same name and parameters as the actual computational function and whose only purpose is to receive the computation results from the actual computational function of the application-server machine;

(d) the placeholder dialogue functions at the application-server machine pass the dialogue data they receive from the real dialogue functions to the Functional Behavior Structure at the application server machine, and the placeholder computational functions at the client machine pass the computation data that they receive from the real computational functions to the Functional Behavior Structure at the client machine, and hence both programs at both machines exhibit identical behavior; and (e) a placeholder dialogue or computational function accepts only the data sent from a function having the same identifier as itself.

* * * * *